United States Patent
Pan

(10) Patent No.: US 8,477,459 B1
(45) Date of Patent: Jul. 2, 2013

(54) DISK DRIVE HEAD GIMBAL ASSEMBLY HAVING A FLEXURE TAIL WITH DUAL CONDUCTIVE LAYERS AND FEATURES TO FACILITATE BONDING

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 133 days.

(21) Appl. No.: 13/282,897

(22) Filed: Oct. 27, 2011

Related U.S. Application Data

(63) Continuation-in-part of application No. 13/078,829, filed on Apr. 1, 2011, now Pat. No. 8,320,084, which is a continuation-in-part of application No. 12/916,237, filed on Oct. 29, 2010.

(51) Int. Cl.
*G11B 5/127* (2006.01)
(52) U.S. Cl.
USPC ...................................................... 360/245.9
(58) Field of Classification Search
USPC ............. 360/245.9, 245.7, 245.3, 245.8, 245, 360/245.4, 234.5, 244.3, 244.8, 244.1, 244
See application file for complete search history.

(56) References Cited

U.S. PATENT DOCUMENTS

| | | | |
|---|---|---|---|
| 5,465,186 A | 11/1995 | Bajorek et al. | |
| 5,861,661 A | 1/1999 | Tang et al. | |
| 5,903,056 A | 5/1999 | Canning et al. | |
| 6,036,813 A | 3/2000 | Schulz et al. | |
| 6,228,689 B1 | 5/2001 | Liu | |
| 6,351,352 B1 | 2/2002 | Khan et al. | |
| 6,381,099 B1 | 4/2002 | Mei | |
| 6,382,499 B1 | 5/2002 | Satoh et al. | |
| 6,614,623 B2 | 9/2003 | Nakamura et al. | |
| 6,639,757 B2 | 10/2003 | Morley et al. | |
| 6,656,772 B2 | 12/2003 | Huang | |
| 6,703,566 B1 | 3/2004 | Shiraishi et al. | |
| 6,757,137 B1 | 6/2004 | Mei | |
| 6,992,862 B2 | 1/2006 | Childers et al. | |
| 7,075,701 B2 | 7/2006 | Novotny et al. | |
| 7,154,708 B2 | 12/2006 | Chhabra et al. | |
| 7,205,484 B2 | 4/2007 | Shiraishi et al. | |
| 7,245,458 B2 | 7/2007 | Zhang et al. | |
| 7,298,593 B2 | 11/2007 | Yao et al. | |
| 7,359,154 B2 | 4/2008 | Yao et al. | |
| 7,372,669 B2 | 5/2008 | Deguchi et al. | |
| 7,375,874 B1 | 5/2008 | Novotny et al. | |

(Continued)

OTHER PUBLICATIONS

Notice of Allowance dated Apr. 11, 2012 from U.S. Appl. No. 13/078,829, 22 pages.

(Continued)

*Primary Examiner* — Allen T Cao

(57) ABSTRACT

A head gimbal assembly for a disk drive includes a laminate flexure having a structural layer, first and second conductive layers, a first dielectric layer between the first and second conductive layers, and a second dielectric layer between the structural layer and the second conductive layer. The second conductive layer includes a plurality of electrical traces. Each of a plurality of flexure bond pads includes a widened region of a corresponding one of the plurality of electrical traces in the second conductive layer, a corresponding one of a plurality of segments or discontinuous islands in the structural layer, and a corresponding one of a plurality of discontinuous islands in the first conductive layer that is electrically connected to an electrical trace in the second conductive layer through one of a plurality of conductive vias through the first dielectric layer.

29 Claims, 11 Drawing Sheets

U.S. PATENT DOCUMENTS

| | | |
|---|---|---|
| 7,388,733 B2 | 6/2008 | Swanson et al. |
| 7,394,139 B2 | 7/2008 | Park et al. |
| 7,414,814 B1 | 8/2008 | Pan |
| 7,440,236 B1 | 10/2008 | Bennin et al. |
| 7,450,346 B2 | 11/2008 | Arya et al. |
| 7,515,240 B2 | 4/2009 | Lu et al. |
| 7,525,769 B2 | 4/2009 | Yao et al. |
| 7,652,890 B2 | 1/2010 | Ohsawa et al. |
| 7,697,102 B2 | 4/2010 | Hirakata et al. |
| 7,764,467 B2 | 7/2010 | Hanya et al. |
| 7,876,664 B2 | 1/2011 | Tsukagoshi et al. |
| 8,015,692 B1 | 9/2011 | Zhang et al. |
| 8,030,576 B2 | 10/2011 | Kamei et al. |
| 8,111,483 B2 | 2/2012 | Arai |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,339,748 B2 * | 12/2012 | Shum et al. ............ 360/245.8 |
| 2001/0017749 A1 | 8/2001 | Stefansky |
| 2005/0030670 A1 | 2/2005 | Ando et al. |
| 2005/0243472 A1 | 11/2005 | Kamigama et al. |
| 2006/0098347 A1 | 5/2006 | Yao et al. |
| 2006/0146262 A1 | 7/2006 | Yu et al. |
| 2006/0157869 A1 | 7/2006 | Huang et al. |
| 2007/0246251 A1 | 10/2007 | Shiraishi et al. |
| 2008/0002303 A1 | 1/2008 | Wang et al. |
| 2008/0068757 A1 | 3/2008 | Kamigama et al. |
| 2008/0088975 A1 * | 4/2008 | Bennin et al. ............ 360/234.5 |
| 2008/0225439 A1 | 9/2008 | Komura |
| 2009/0151994 A1 | 6/2009 | Ohsawa et al. |
| 2009/0211789 A1 | 8/2009 | Yeates et al. |
| 2009/0253233 A1 | 10/2009 | Chang et al. |
| 2010/0118444 A1 | 5/2010 | Rothenberg et al. |
| 2010/0176827 A1 | 7/2010 | Yamazaki et al. |
| 2010/0188778 A1 | 7/2010 | Castagna |
| 2010/0195474 A1 | 8/2010 | Tsukuda et al. |
| 2011/0317309 A1 * | 12/2011 | Shum et al. ............ 360/99.08 |
| 2012/0067626 A1 | 3/2012 | Mizutani |

OTHER PUBLICATIONS

Notice of Allowance dated May 21, 2012 from U.S. Appl. No. 13/164,936, 17 pages.

Notice of Allowance dated May 21, 2012 from U.S. Appl. No. 13/398,578, 16 pages.

Notice of Allowance dated May 29, 2012 from U.S. Appl. No. 13/164,959, 17 pages.

US 7,337,529, 03/2008, Bennin et al. (withdrawn)

\* cited by examiner

DISK DRIVE HEAD GIMBAL ASSEMBLY HAVING A FLEXURE TAIL WITH DUAL CONDUCTIVE LAYERS AND FEATURES TO FACILITATE BONDING

CROSS-REFERENCE TO RELATED APPLICATIONS

This application is a continuation-in-part of pending U.S. patent application Ser. No. 13/078,829, filed Apr. 1, 2011, and entitled "Disk drive head gimbal assembly having a flexure tail with features to facilitate bonding," which is incorporated herein by reference in its entirety, and which is a continuation-in-part of pending U.S. patent application Ser. No. 12/916,237, filed Oct. 29, 2010, and entitled "Disk drive head gimbal assembly having a flexure tail with folded bond pads," which is also incorporated herein by reference in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, micro-actuation, flying height control, touch down detection, lapping control, etc). A contemporary trend is to include more devices in and on the head, which may facilitate reading and writing (for example, a heater to reduce head-disk spacing during reading or writing), and/or perform other functions such as microactuation or lapping control. As more devices are included in and on the head, the number of electrical connections to the head must increase. Hence there is a need in the art for methods and structures to facilitate or accommodate an increased number of electrical connections to a head in an information storage device.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator.

Modern laminated flexures typically include conductive copper traces that are isolated from a stainless steel structural layer by a polyimide dielectric layer. So that the signals from/to the head can reach the FPC on the actuator body, each HGA flexure includes a flexure tail that extends away from the head along a corresponding actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained against the conductive electrical terminals of the FPC while the aforementioned electrical connections are made (e.g. by ultrasonic bonding, solder jet bonding, or solder bump reflow).

However, recently for some disk drive products, the aforementioned electrical connections may employ a type of anisotropic conductive film (ACF) bonding. An anisotropic conductive film is typically an adhesive doped with conductive beads or cylindrical particles of uniform or similar diameter. As the doped adhesive is compressed and cured, it is squeezed between the surfaces to be bonded with sufficient uniform pressure that a single layer of the conductive beads makes contact with both surfaces to be bonded. In this way, the thickness of the adhesive layer between the bonded surfaces becomes approximately equal to the size of the conductive beads. The cured adhesive film may conduct electricity via the contacting beads in a direction normal to the bonded surfaces (though may not necessarily conduct electricity parallel to the bonded surfaces, since the beads may not touch each other laterally—though axially each bead is forced to contact both of the surfaces to be bonded—hence the term "anisotropic").

Maintaining sufficient uniform pressure during adhesive curing, such that a single layer of conductive beads in an ACF makes contact with both opposing surfaces to be bonded, may be achievable for existing HGA designs using a tool that presses only upon a single bond pad. However, in a high-volume manufacturing environment like that necessitated by the very competitive information storage device industry, there is a practical requirement for fast, cost-effective, and robust bonding of many bond pads simultaneously; bonding one bond pad at a time simply takes too much time.

Accordingly, there is a need in the art for an improved HGA design that may facilitate the application of more uniform pressure to groups of bond pads, to more quickly accomplish reliable electrical connection of the conductive traces of a flexure tail to the conductive electrical terminals of a FPC (e.g. by ACF or by any other bonding method that benefits from a more uniform bonding pressure) during HSA manufacture.

DESCRIPTION OF THE PREFERRED EMBODIMENTS

Figure 1:
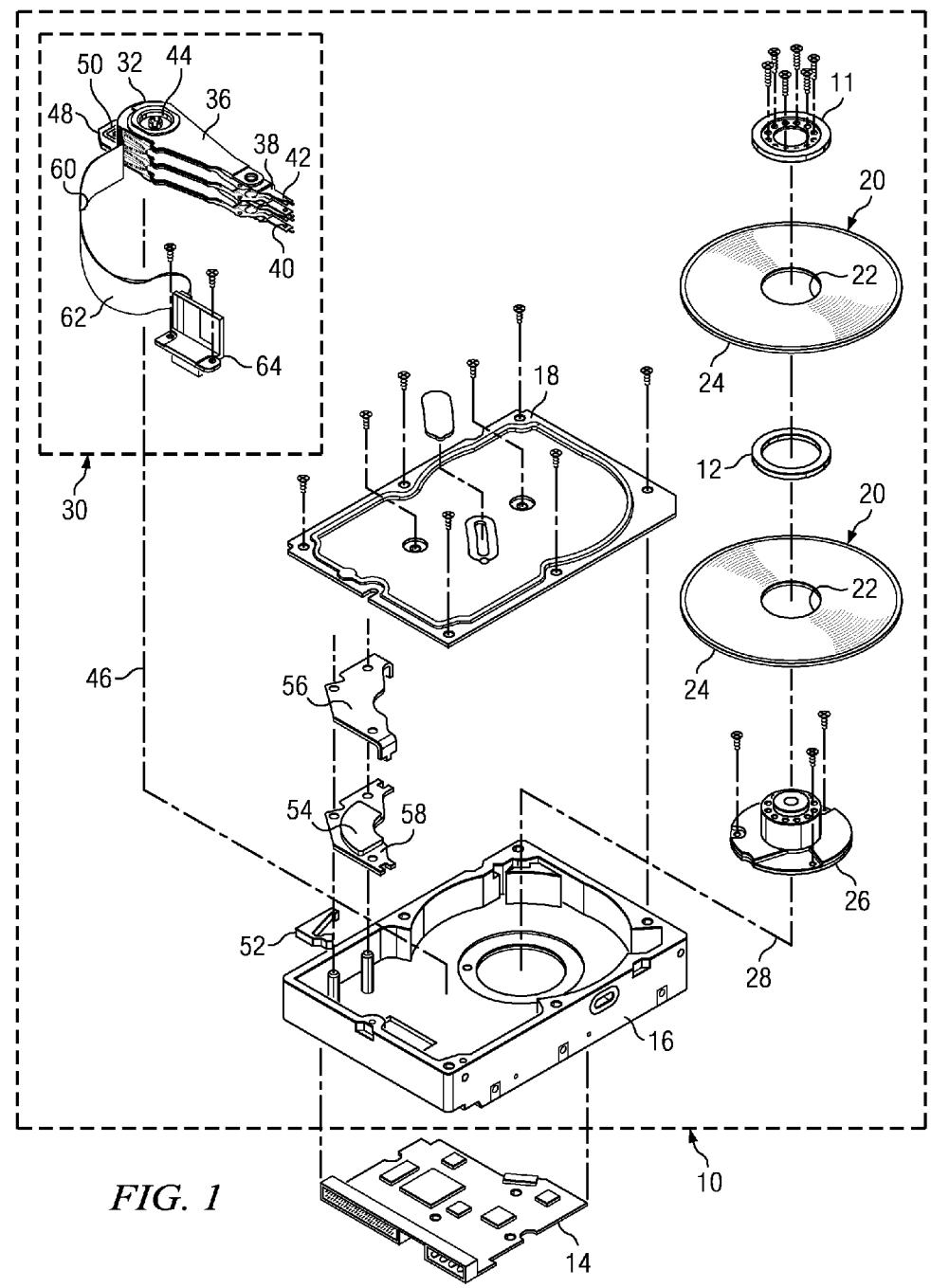
FIG. 1 is an exploded perspective view of a disk drive according to an embodiment of the present invention.

FIG. 1 is an exploded perspective view of a disk drive according to an example embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

The HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore 44 and a pivot bearing cartridge engaged within the bore for facilitating the HSA 30 to rotate relative to HDA 10 about actuator pivot axis 46. One or two head gimbal assemblies (HGA) 38 are attached to a distal end of each actuator arm 36. Each HGA includes a head (e.g. head 40) for reading and writing data from and to the disk 20, and a load beam 42 to compliantly preload the head against the disk 20. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

The PCBA 14 includes a servo control system for generating servo control signals to control the current through the coil 50 and thereby position the HSA 30 relative to tracks disposed upon surfaces of disk 20. The PCBA 14 also includes channel electronics to receive and provide electrical signals to the heads 40 of the HGAs 38 of the HSA 30, e.g. for reading and writing data to the disks 20. The HSA 30 is electrically connected to PCBA 14 via a flexible printed circuit (FPC) 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
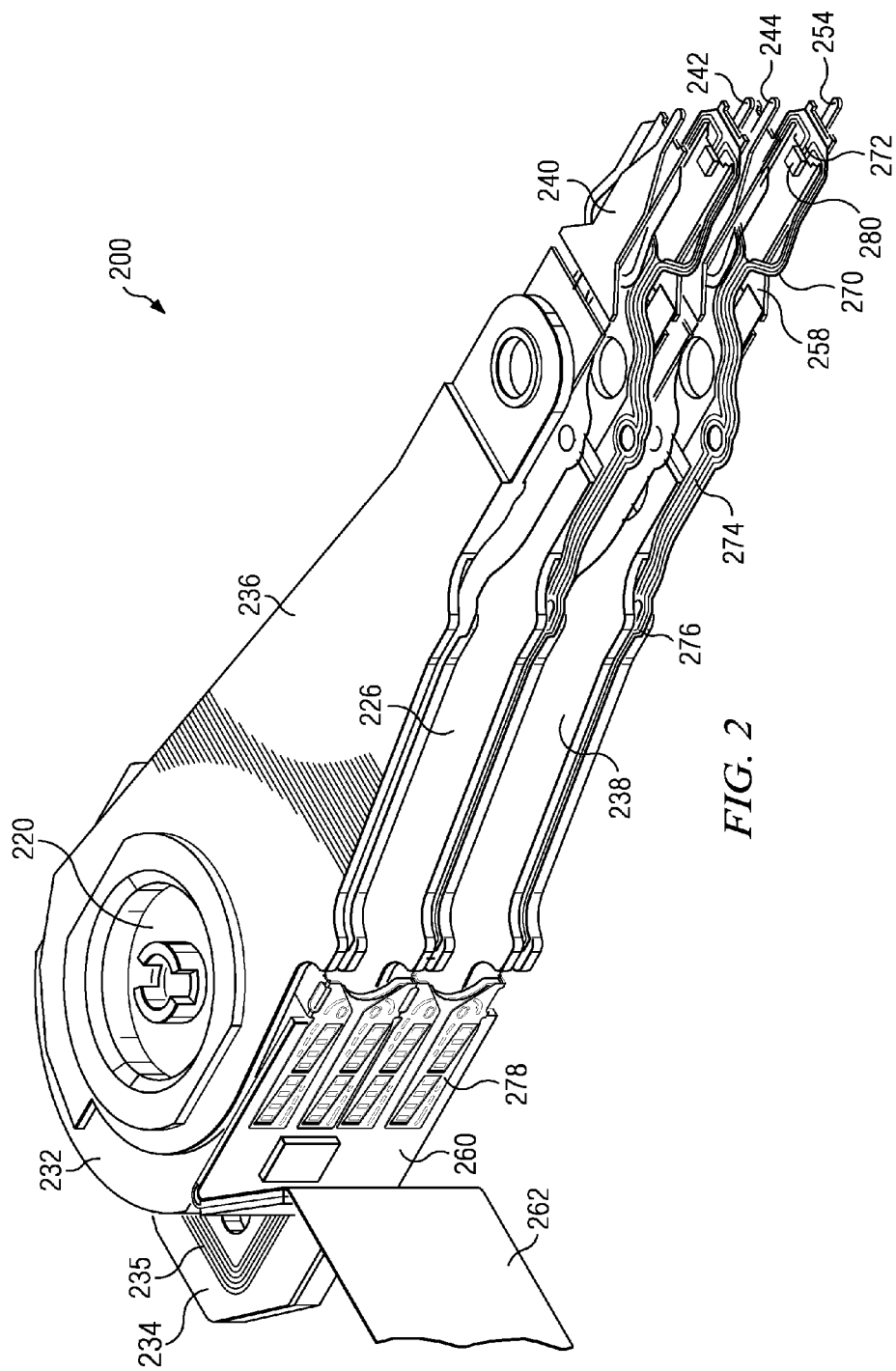
FIG. 2 is a perspective view of a head stack assembly (HSA) according to an embodiment of the present invention.

FIG. 2 is a perspective view of a head stack assembly (HSA) 200 according to an example embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs 242, 244, while each of the outer actuator arms 236, 238, includes only one HGA. This is because in a fully populated disk drive the inner arm(s) are positioned between two disk surfaces while the outer actuator arms are positioned over (or under) a single disk surface. In a depopulated disk drive, however, any of the actuator arms may have one or zero HGAs, possibly replaced by a dummy mass.

Each HGA includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam 258 (another part of the HGA 254). The laminated flexure 270 may include a structural layer (e.g. stainless steel), dielectric layers (e.g. polymide), and conductive layers into which traces are patterned (e.g. copper). The HSA 200 also includes a flexible printed circuit (FPC) 260 adjacent the actuator body 232, and the FPC 260 includes a flex cable 262. The FPC 260 may comprise a laminate that includes two or more conventional dielectric and conductive layer materials (e.g. one or more polymeric materials, copper, etc). The laminated flexure 270 includes a flexure tail 274 that includes an intermediate region 276 that is disposed adjacent the actuator arm 238, and a terminal region 278 that is electrically connected to bond pads of the FPC 260.

Methods of electrical connection of the flexure tails to the FPC 260 include solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining sufficient uniform pressure to groups of bond pads may be desirable during this process, and may be facilitated by certain inventive structural features in the terminal regions of the flexure tails.

Figure 3:
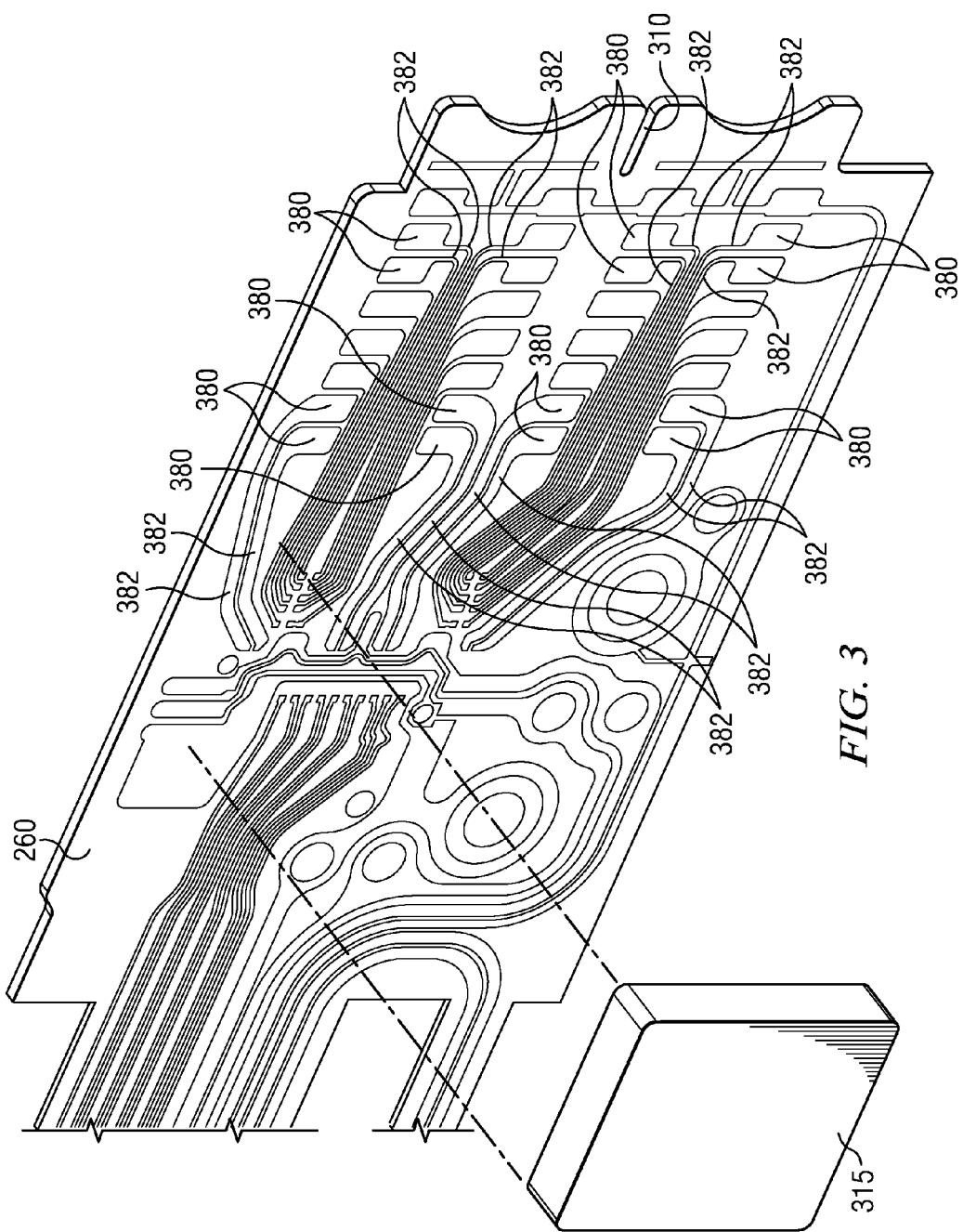
FIG. 3 is a perspective view of a portion of a flexible printed circuit (FPC) according to an embodiment of the present invention.

FIG. 3 depicts the FPC 260 before flexure tail terminal regions (e.g. flexure tail terminal region 278) are bonded thereto. The FPC 260 includes electrical conduits 382 that terminate at electrically conductive FPC bond pads 380, which are aligned with and connected to flexure bond pads of the terminal regions (e.g. flexure tail terminal region 278) of the HGA flexure tails. The FPC electrical conduits 382 may connect to a pre-amplifier chip 315 (shown exploded from the FPC 260 in FIG. 3). Intermediate regions of two of the HGA flexure tails (e.g. flexure tail intermediate region 276) may pass through the FPC slit 310 to help facilitate their support and alignment. The FPC 260 may include an optional insulative cover layer having windows exposing the regions where the flexure tail terminal regions and the pre-amplifier chip 315 are bonded thereto. Such cover layer is not shown in the view of FIG. 3, so that the electrical conduits 382 could be shown without being obscured or partially obscured by the cover layer.

Figure 4:
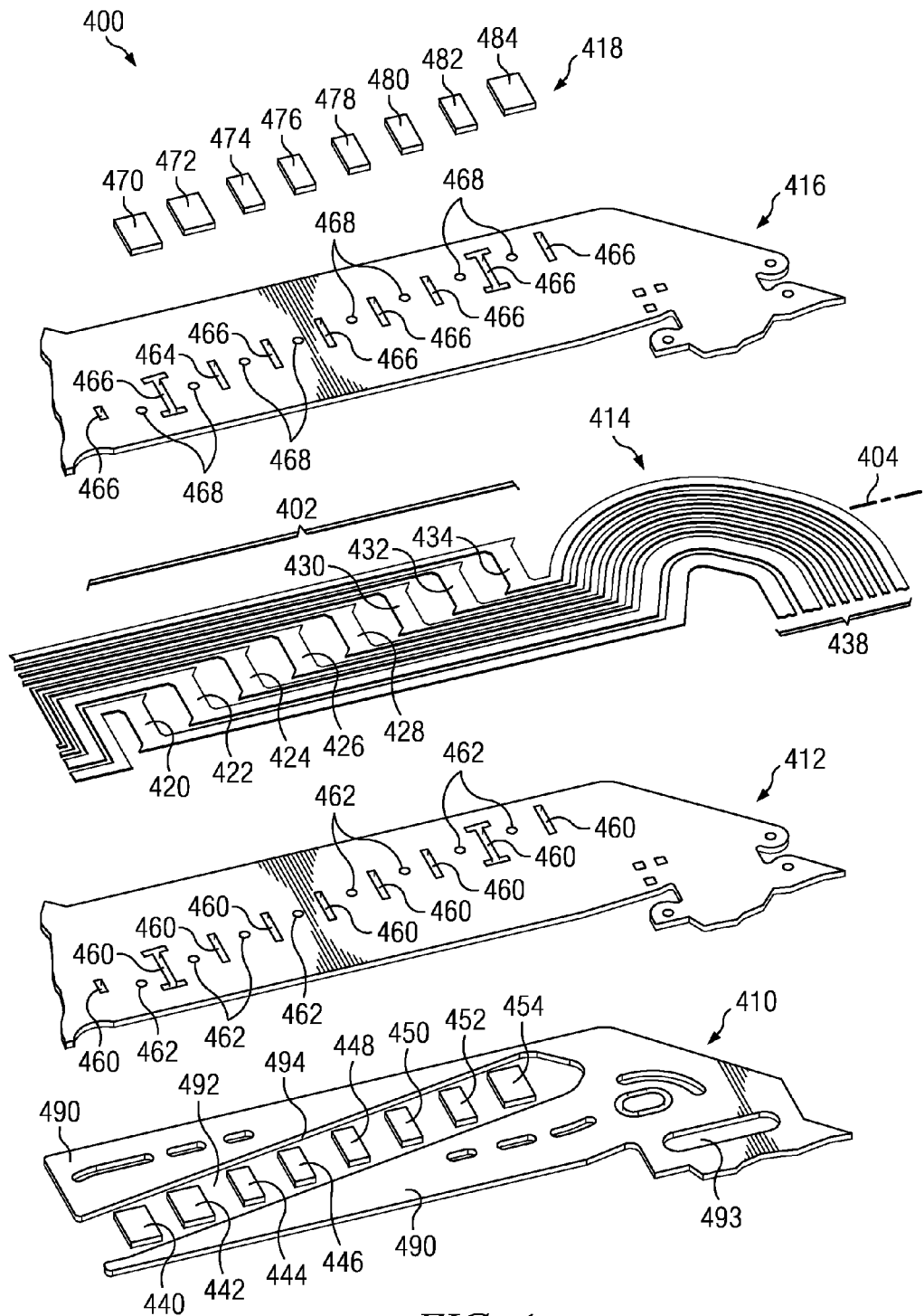
FIG. 4 is an exploded perspective view of a flexure tail terminal region, according to an embodiment of the present invention.

FIG. 4 is an exploded perspective view of a terminal region of a flexure tail 400, according to an embodiment of the present invention. The flexure tail 400 of the laminate flexure comprises a structural layer 410, a first conductive layer 418, and a second conductive layer 414. The flexure tail 400 also includes a first dielectric layer 416 between the first conductive layer 418 and the second conductive layer 414, and a second dielectric layer 412 between the structural layer 410 and the second conductive layer 414. In certain embodiments, the structural layer 410 comprises stainless steel, the dielectric layers 412, 416 comprise polyimide, and the conductive layers 414, 418 comprise copper, for example, though it is contemplated that other materials providing similar function might be used instead.

In the embodiment of FIG. 4, the second conductive layer 414 of the flexure tail 400 includes eight electrical traces 438. Each of the electrical traces 438 includes a corresponding one of a plurality of widened regions 420, 422, 424, 426, 428, 430, 432, 434 in a non-disposable region 402 to be aligned with FPC bond pads (e.g. FPC bond pads 380 shown in FIG. 3). In this context, "widened" means wider than the width of a trace 438 in an intermediate region where the flexure tail 400 runs along the arm (i.e. the width of a trace 438 at the right side of FIG. 4). Specifically, each of the plurality of widened regions 420, 422, 424, 426, 428, 430, 432, 434 may be preferably aligned with a corresponding one of the plurality of FPC bond pads 380 shown in FIG. 3. As shown in FIG. 4, each of the widened regions 420, 422, 424, 426, 428, 430, 432, 434 may extend further transverse to the flexure tail longitudinal axis 404 than it extends parallel to the flexure tail longitudinal axis 404.

As shown in FIG. 4, each of the widened regions 420, 422, 424, 426, 428, 430, 432, 434 may extend further transverse to the flexure tail longitudinal axis 404 than it extends parallel to the flexure tail longitudinal axis 404. In certain embodiments, such inequality may render the widened regions to be relatively less sensitive to transverse misalignment with the corresponding FPC bond pad 380 of FIG. 3. Such transverse misalignment during disk drive assembly may be caused by FPC position variability (e.g. due to alignment pin to hole clearance), and/or undesired movement of the flexure tail by a manufacturing employee. Note that, during disk drive assembly, a manufacturing employee may more easily misalign the terminal region of the flexure tail 400 transverse to the flexure tail longitudinal axis 404 than parallel to the flexure tail longitudinal axis 404, since the flexure is difficult to stretch, and so moves more easily in the transverse direction. In this context "parallel" does not imply perfectly parallel, but rather approximately parallel (e.g. ±10 degrees from perfectly parallel). Likewise, "transverse" does not imply perfectly perpendicular, but rather approximately perpendicular (e.g. ±10 degrees from perfectly perpendicular).

In the embodiment of FIG. 4, a plurality of discontinuous islands 440, 442, 444, 446, 448, 450, 452, 454 are defined in the structural layer 410 and are disposed in general alignment with corresponding widened regions in the second conductive layer 414. For example, discontinuous island 444 is disposed in general alignment with widened region 424. In this context, an island in the structural layer 410 is considered to be discontinuous if it does not directly contact the rest of the structural layer 410, even if it is joined by a web or bridge in the second dielectric layer 412.

Also in the embodiment of FIG. 4, a plurality of discontinuous islands 470, 472, 474, 476, 478, 480, 482, 484 are defined in the first conductive layer 418, and are disposed in general alignment with corresponding widened regions in the second conductive layer 414. For example, discontinuous island 474 is disposed in general alignment with widened region 424. In this context, an island in the first conductive layer 418 is considered to be discontinuous if it does not directly contact the rest of the first conductive layer 418, even if it is joined by a web or bridge in the first dielectric layer 416.

In the embodiment of FIG. 4, each widened region 420, 422, 424, 426, 428, 430, 432, 434, along with the corresponding discontinuous island 440, 442, 444, 446, 448, 450, 452, 454 in the structural layer 410 with which it is aligned, and the corresponding discontinuous island 470, 472, 474, 476, 478, 480, 482, 484 in the first conductive layer 418 with which it is also aligned, defines a flexure bond pad or flexure bond pad location.

In the embodiment of FIG. 4, each of the plurality of discontinuous islands 470, 472, 474, 476, 478, 480, 482, 484 in the first conductive layer 418 is electrically connected to a corresponding one of the plurality of widened regions 420, 422, 424, 426, 428, 430, 432, 434 in the second conductive layer 414 through one of a first plurality of conductive vias 468 through the first dielectric layer 416. The conductive vias 468 allow electrical connection between FPC bond pads (e.g. FPC bond pads 380) and the discontinuous islands 470, 472, 474, 476, 478, 480, 482, 484 in the first conductive layer 418, to function also as electrical connection to the corresponding widened regions 420, 422, 424, 426, 428, 430, 432, 434 in the second conductive layer 414. The conductive vias 468 through the first dielectric layer 416 do not electrically short the plurality of widened regions 420, 422, 424, 426, 428, 430, 432, 434 in the second conductive layer 414, because the islands 470, 472, 474, 476, 478, 480, 482, 484 in the first conductive layer 418 are discontinuous.

Also in the embodiment of FIG. 4, each of the plurality of discontinuous islands 440, 442, 444, 446, 448, 450, 452, 454 in the structural layer 410 is optionally electrically connected to a corresponding one of the plurality of widened regions 420, 422, 424, 426, 428, 430, 432, 434 in the second conductive layer 414 through one of a second plurality of conductive vias 462 through the second dielectric layer 412. The optional conductive vias 462 allow the plurality of discontinuous islands 440, 442, 444, 446, 448, 450, 452, 454 in the structural layer 410 to function as convenient electrical contacts for probing or testing (or other temporary or permanent electrical connection to) the plurality of widened regions 420, 422, 424, 426, 428, 430, 432, 434 in the second conductive layer 414, accessible from the opposite side of the flexure tail terminal region 400 than are the discontinuous islands 470, 472, 474, 476, 478, 480, 482, 484 in the first conductive layer 418. The optional conductive vias 462 through the second dielectric layer 412 do not electrically short the plurality of widened regions 420, 422, 424, 426, 428, 430, 432, 434 in the second conductive layer 414, because the islands 440, 442, 444, 446, 448, 450, 452, 454 in the structural layer 410 are discontinuous.

In the embodiment of FIG. 4, the structural layer 410 includes a peripheral frame 490 that defines and surrounds a structural layer window 492. As shown in FIG. 4, the discontinuous islands 440, 442, 444, 446, 448, 450, 452, 454 are disposed within the structural layer window 492. The peripheral frame 490 underlies a region of the plurality of electrical traces 438 where the traces are relatively narrow. Although the structural layer window 492 has a broken and open inner contour 494 in the embodiment of FIG. 4, it may be a closed and continuous inner contour in certain alternative embodiments.

In the embodiment of FIG. 4, the discontinuous islands in the structural layer 410 preferably increase the thickness of the flexure tail terminal region 400 at the locations of the flexure bond pads (e.g. at the location of the widened region 424). For example, the thickness of the structural layer 410 may be preferably less than 25 microns, the thickness of each of the dielectric layers 412, 416 may be preferably no greater than 15 microns, the thickness of each of the conductive layers 414, 418 may be preferably less than 15 microns, while a total thickness of the flexure tail terminal region 400 at the flexure bond pads is preferably at least 35 microns. Such inequalities may enhance the utility of a non-patterned thermode tool to apply more uniform heat and pressure to the flexure bond pads during bonding.

In the embodiment of FIG. 4, the discontinuous islands 470, 472, 474, 476, 478, 480, 482, 484 in the first conductive layer 418 are the most protruding features on the surface of the flexure tail 400 that faces the FPC (e.g. FPC 260). For example, no cover layer is even with, or protrudes more than, the conductive discontinuous islands 470, 472, 474, 476, 478, 480, 482, 484. Such feature may facilitate simultaneous bonding of multiple bond pads by single tool, for example a thermode tool that accomplishes bonding by applying heat and pressure to an anisotropic conductive film. Likewise, the plurality of discontinuous islands 440, 442, 444, 446, 448, 450, 452, 454 in the structural layer 410 are the highest features on the side of the flexure tail 400 that faces away from the FPC (e.g. FPC 260), which may also facilitate bonding of multiple bond pads by single tool.

In the embodiment of FIG. 4, each of the widened regions 420, 422, 424, 426, 428, 430, 432, 434 defines a widened region width that is measured parallel to the flexure tail longitudinal axis 404. Likewise, each of the plurality of discontinuous islands 440, 442, 444, 446, 448, 450, 452, 454 in the structural layer 410 defines an island width that is measured parallel to the flexure tail longitudinal axis 404. In certain embodiments, the widened region width is preferably no greater than, but at least 80% of, the island width. Such inequality may enhance the uniformity of the heat and pressure transferred from the thermode tool through the discontinuous islands to the widened regions during bonding.

In the embodiment of FIG. 4, the first dielectric layer 416 covers the conductive traces 438 of the second conductive layer 414, except for a plurality of through openings 466, and the plurality of conductive vias 468, through the first dielectric layer 416. Each of the plurality of the openings 466 through the first dielectric layer 416 may be disposed adjacent at least one of the plurality of discontinuous islands 470, 472, 474, 476, 478, 480, 482, 484 in the first conductive layer 418. In certain embodiments, the openings 466 through the first dielectric layer 416 may serve an adhesive control purpose (e.g. to limit the spread of adhesive used during the flexure tail bonding process).

In the embodiment of FIG. 4, the second dielectric layer 412 electrically insulates the conductive traces 438 of the second conductive layer 414 from the structural layer 410 (except for optional connections from the widened regions 420, 422, 424, 426, 428, 430, 432, 434 to the discontinuous islands 440, 442, 444, 446, 448, 450, 452, 454 in the structural layer 410, made by the optional conductive vias 462 through the second dielectric layer 412). Such electrical insulation may be desired because the structural layer 410 may be electrically conductive (e.g. stainless steel), and so otherwise the structural layer 410 may cause an electrical short between the traces 438 and/or from the traces 438 to ground. In the embodiment of FIG. 4, the second dielectric layer 412 optionally includes a plurality of through openings 460. Each of the plurality of the openings 460 through the second dielectric layer 412 may be disposed adjacent, but preferably not overlying, at least one of the plurality of discontinuous islands 440, 442, 444, 446, 448, 450, 452, 454 in the structural layer 410. In certain embodiments, the openings 460 through the second dielectric layer 412 may be aligned with corresponding openings 266 in the first dielectric layer 416, and serve an adhesive control purpose (e.g. to limit the spread of adhesive used during the flexure tail bonding process).

In the embodiment of FIG. 4, the flexure tail terminal region 400 may optionally include a disposable test pad region to the left of the other structures shown in FIG. 4. Such disposable test pad region has been cut away/is not shown in FIG. 4, to more clearly depict the bond pads and associated layers of the flexure tail terminal region 400. After HGA testing, and before the bond pads of the flexure tail 400 are bonded to the FPC, the disposable test pad region (that would lie to the left of the flexure tail terminal region that is shown in FIG. 4) is preferably cut away from the flexure tail 400, so that only the non-disposable region shown in FIG. 4 (and the rest of the flexure tail 400 that would extend to the right of the view of FIG. 4) remains.

Figure 5:
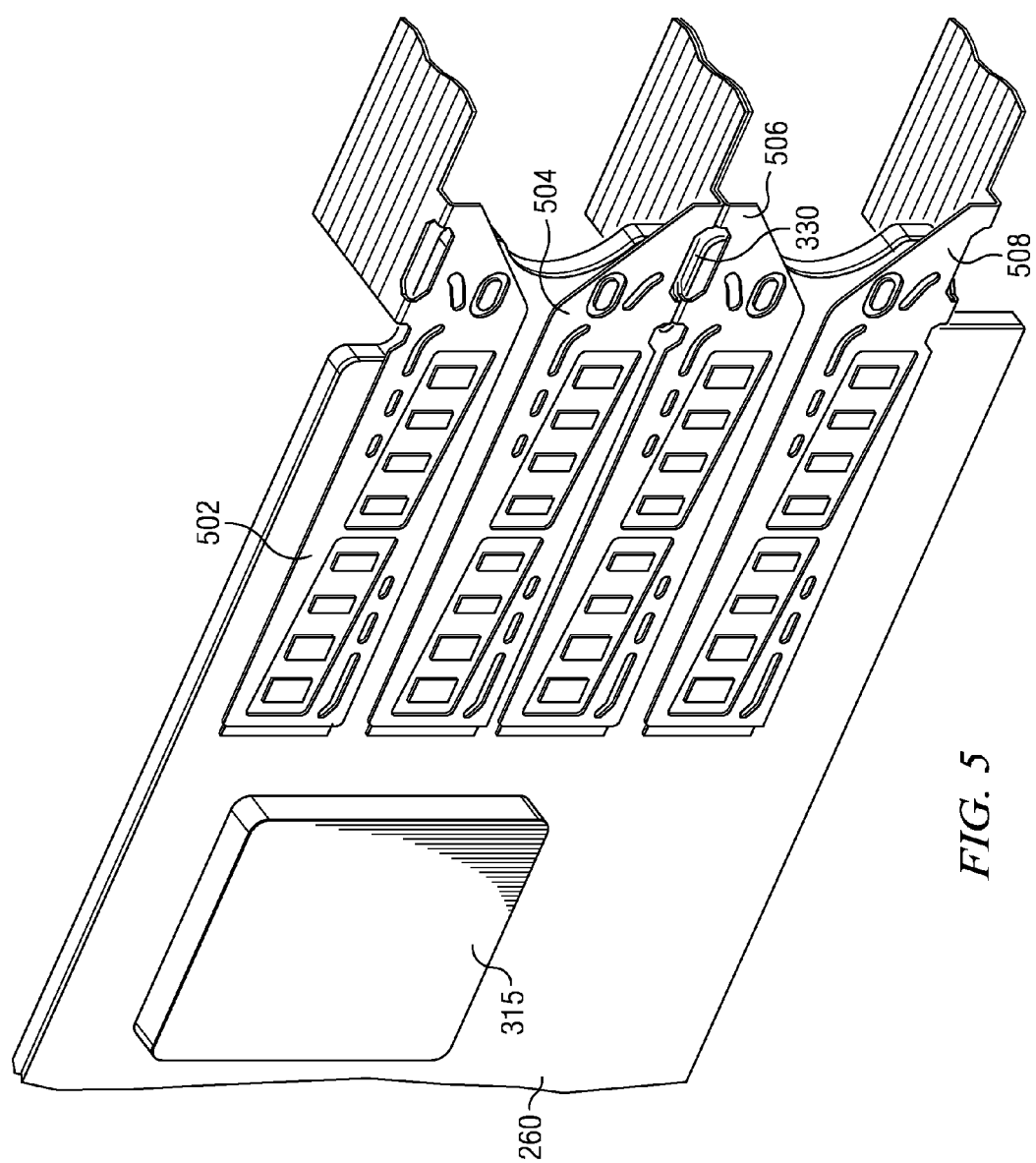
FIG. 5 is a perspective view of a plurality of flexure tail terminal regions attached to the FPC of FIG. 3, according to an embodiment of the present invention.

FIG. 5 is a perspective view of the terminal regions of a plurality of flexure tails 502, 504, 506, 508 attached to the FPC 260 of FIG. 3, according to an embodiment of the present invention. An intermediate region of the flexure tails 504, 506 may extend into a slit 310 in the FPC 260 with the flexure tails 504, 506 being bent near the slit 310 so that the flexure tail terminal regions are substantially orthogonal to the intermediate region of the same flexure tail. In the embodiment of FIG. 4, such bending may be facilitated by an optional opening (e.g. opening 493) that locally weakens the structural layer 410. Now referring again to FIG. 5, the FPC 260 is shown to include pre-amplifier chip 315, and the structural layers of the flexure tails 502, 504, 506, 508 are visible because they are facing the viewer.

Figure 6:
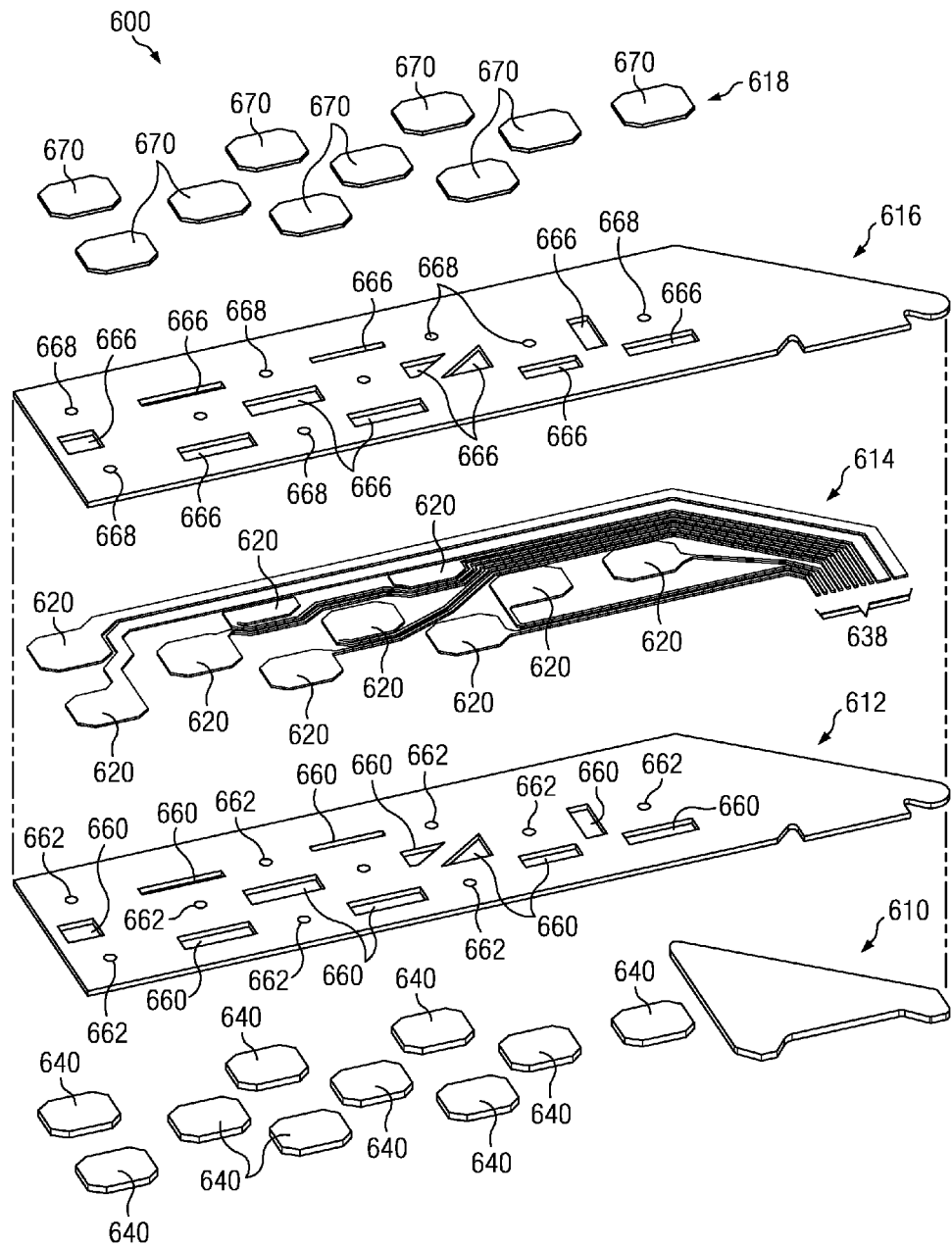
FIG. 6 is an exploded perspective view of a flexure tail terminal region, according to another embodiment of the present invention.
Figure 7:
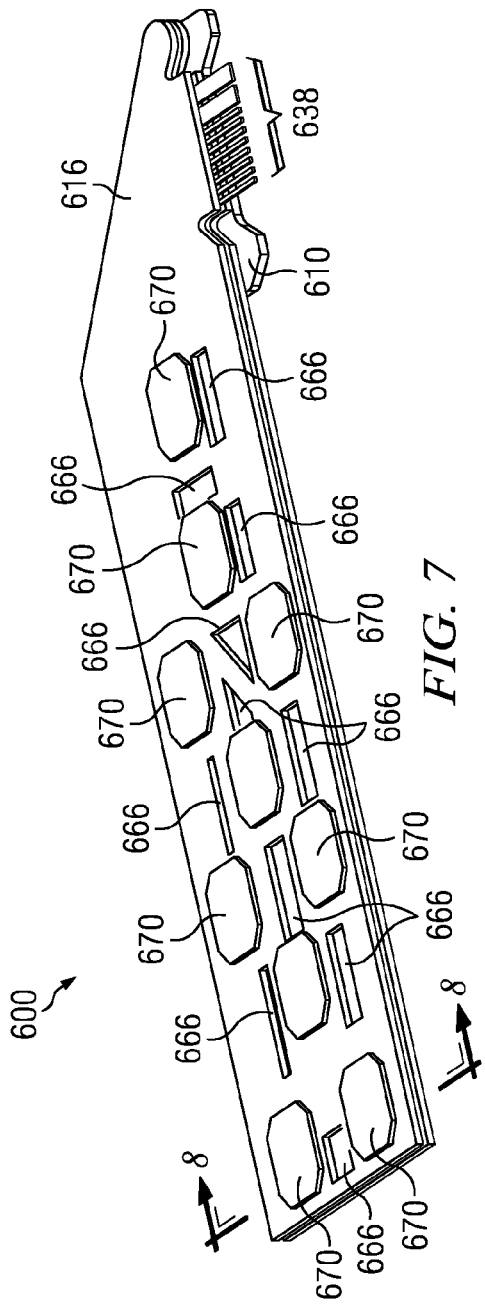
FIG. 7 is a non-exploded perspective view of the flexure tail terminal region of FIG. 6.
Figure 8:
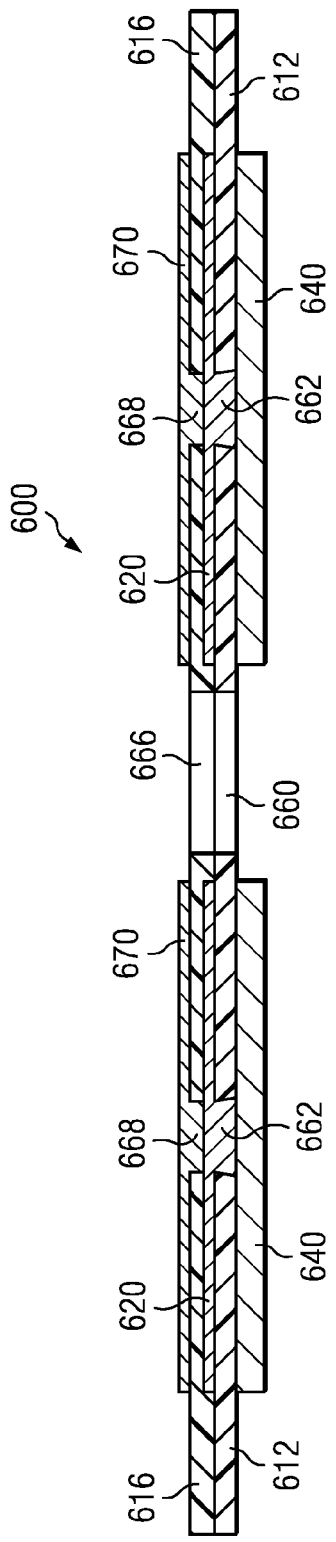
FIG. 8 is a cross sectional view of the flexure tail terminal region of FIG. 7.

FIG. 6 is an exploded perspective view of a terminal region of a flexure tail 600, according to another embodiment of the present invention. FIG. 7 is a non-exploded perspective view of the terminal region of the flexure tail 600. FIG. 8 is a cross sectional view of the terminal region of the flexure tail 600. The flexure tail 600 of the laminate flexure comprises a structural layer 610, a first conductive layer 618, and a second conductive layer 614. The flexure tail 600 also includes a first dielectric layer 616 between the first conductive layer 618 and the second conductive layer 614, and a second dielectric layer 612 between the structural layer 610 and the second conductive layer 614. In certain embodiments, the structural layer 610 comprises stainless steel, the dielectric layers 612, 616 comprise polyimide, and the conductive layers 614, 618 comprise copper, for example, though it is contemplated that other materials providing similar function might be used instead.

In the embodiment of FIGS. 6-8, the second conductive layer 614 of the flexure tail 600 includes ten electrical traces 638. Each of the electrical traces 638 includes a corresponding one of a plurality of widened regions 620. In this context, "widened" means wider than the width of a trace 638 in an intermediate region where the flexure tail 600 runs along the arm (i.e. the width of a trace 638 at the right side of FIG. 6). Each of the plurality of widened regions 620 may be preferably aligned with a corresponding one of a plurality of FPC bond pads after head stack assembly is complete.

In the embodiment of FIGS. 6-8, a plurality of discontinuous islands 640 are defined in the structural layer 610 and are disposed in general alignment with corresponding widened regions 620 in the second conductive layer 614. In this context, an island in the structural layer 610 is considered to be discontinuous if it does not directly contact the rest of the structural layer 610, even if it is joined by a web or bridge in the second dielectric layer 612.

Also in the embodiment of FIGS. 6-8, a plurality of discontinuous islands 670 are defined in the first conductive layer 618, and are disposed in general alignment with corresponding widened regions 620 in the second conductive layer 614. In this context, an island in the first conductive layer 618 is considered to be discontinuous if it does not directly contact the rest of the first conductive layer 618, even if it is joined by a web or bridge in the first dielectric layer 616. In the embodiment of FIGS. 6-8, each widened region 420, along with the corresponding discontinuous island 640 in the structural layer 610 with which it is aligned, and the corresponding discontinuous island 670 in the first conductive layer 618 with which it is also aligned, defines a flexure bond pad or flexure bond pad location.

In the embodiment of FIGS. 6-8, each of the plurality of discontinuous islands 670 in the first conductive layer 618 is electrically connected to a corresponding one of the plurality of widened regions 620 in the second conductive layer 614 through one of a first plurality of conductive vias 668 through the first dielectric layer 616. In certain (more preferred) embodiments, the conductive vias 668 allow electrical connection between FPC bond pads and the discontinuous islands 670 in the first conductive layer 618, to function also as electrical connection to the corresponding widened regions 620 in the second conductive layer 614. However, in certain (less preferred) embodiments, the plurality of discontinuous islands 670 in the first conductive layer 618 may be used only for temporary electrical connections or probing during testing, while the plurality of discontinuous islands 640 in the structural layer 610 may be used for permanent connections to the FPC bond pads. The conductive vias 668 through the first dielectric layer 616 do not electrically short the plurality of widened regions 620 in the second conductive layer 614, because the islands 670 in the first conductive layer 618 are discontinuous.

Also in the embodiment of FIGS. 6-8, each of the plurality of discontinuous islands 640 in the structural layer 610 is optionally electrically connected to a corresponding one of the plurality of widened regions 620 in the second conductive layer 614 through one of a second plurality of conductive vias 662 through the second dielectric layer 612. In certain preferred embodiments, the optional conductive vias 662 allow the plurality of discontinuous islands 640 in the structural layer 610 to function as convenient electrical contacts for probing or testing (or other temporary or permanent electrical connection to) the plurality of widened regions 620 in the second conductive layer 614, accessible from the opposite side of the flexure tail terminal region 600 than are the discontinuous islands 670 in the first conductive layer 618. The optional conductive vias 662 through the second dielectric layer 612 do not electrically short the plurality of widened regions 620 in the second conductive layer 614, because the islands 640 in the structural layer 610 are discontinuous.

In the embodiment of FIGS. 6-8, the discontinuous islands 640 in the structural layer 610 preferably increase the thickness of the flexure tail terminal region 600 at the locations of the flexure bond pads (e.g. at the locations of the widened regions 620). For example, the thickness of the structural layer 610 may be preferably less than 25 microns, the thickness of each of the dielectric layers 612, 616 may be preferably no greater than 15 microns, the thickness of each of the conductive layers 614, 618 may be preferably less than 15 microns, while a total thickness of the flexure tail terminal region 600 at the flexure bond pads is preferably at least 35 microns. Such inequalities may enhance the utility of a non-patterned thermode tool to apply more uniform heat and pressure to the flexure bond pads during bonding.

In the embodiment of FIGS. 6-8, the discontinuous islands 670 in the first conductive layer 618 are the most protruding features on the surface of the flexure tail 600 that faces the FPC. For example, no cover layer is even with, or protrudes more than, the conductive discontinuous islands 670. Such feature may facilitate simultaneous bonding of multiple bond pads by single tool, for example a thermode tool that accomplishes bonding by applying heat and pressure to an anisotropic conductive film. Likewise, the plurality of discontinuous islands 640 in the structural layer 610 are the highest features on the side of the flexure tail 600 that faces away from the FPC, which may also facilitate bonding of multiple bond pads by single tool.

In the embodiment of FIGS. 6-8, each of the widened regions 620 defines a widened region width. Likewise, each of the plurality of discontinuous islands 640 in the structural layer 610 defines an island width. In certain embodiments, the widened region width is preferably no greater than, but at least 80% of, the island width. Such inequality may enhance the uniformity of the heat and pressure transferred from the thermode tool through the discontinuous islands to the widened regions during bonding.

In the embodiment of FIGS. 6-8, the first dielectric layer 616 covers the conductive traces 638 of the second conductive layer 614, except for a plurality of through openings 666, and the plurality of conductive vias 668, through the first dielectric layer 616. Each of the plurality of the openings 666 through the first dielectric layer 616 may be disposed adjacent at least one of the plurality of discontinuous islands 670 in the first conductive layer 618. In certain embodiments, the openings 666 through the first dielectric layer 616 may serve an adhesive control purpose (e.g. to limit the spread of adhesive used during the flexure tail bonding process).

In the embodiment of FIGS. 6-8, the second dielectric layer 612 electrically insulates the conductive traces 638 of the second conductive layer 614 from the structural layer 610 (except for optional connections from the widened regions 620 to the discontinuous islands 640 in the structural layer 610, made by the optional conductive vias 662 through the second dielectric layer 612). Such electrical insulation may be desired because the structural layer 610 may be electrically conductive (e.g. stainless steel), and so otherwise the structural layer 610 may cause an electrical short between the traces 638 and/or from the traces 638 to ground.

In the embodiment of FIGS. 6-8, the second dielectric layer 612 optionally includes a plurality of through openings 660. Each of the plurality of the openings 660 through the second dielectric layer 612 may be disposed adjacent, but preferably not overlying, at least one of the plurality of discontinuous islands 640 in the structural layer 610. In certain embodiments, the openings 660 through the second dielectric layer 612 may be aligned with corresponding openings 666 in the first dielectric layer 616, and serve an adhesive control purpose (e.g. to limit the spread of adhesive used during the flexure tail bonding process).

Figure 9A:
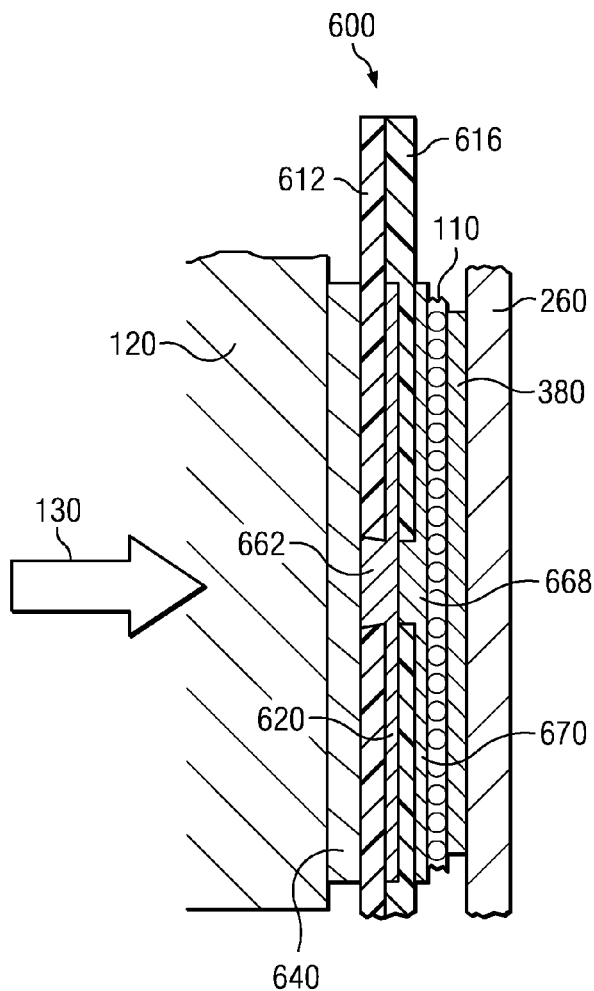
FIG. 9A depicts the bonding of a flexure bond pad to a corresponding flexible printed circuit bond pad by an anisotropic conductive film, according to an embodiment of the present invention.
Figure 9B:
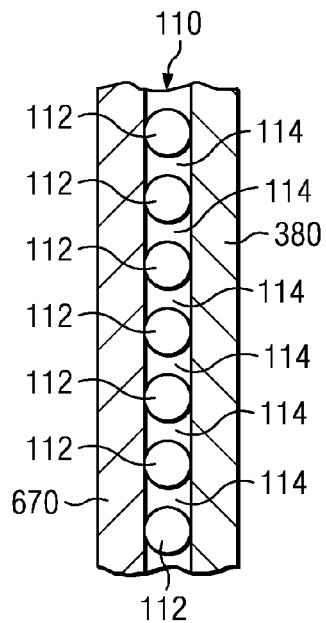
FIG. 9B is an expanded view of a portion of FIG. 9A.

In certain embodiments, each of the flexure bond pads may be bonded to a corresponding one of the plurality of FPC bond pads 380 by an anisotropic conductive film (ACF). For example, FIGS. 9A-B depict the bonding of a flexure tail terminal region 600 to a corresponding FPC bond pad 380 by an ACF 110. Now referring to FIGS. 6-8, 9A, and 9B, a thermode tool 120 may be brought into contact with a plurality of discontinuous islands (e.g. including discontinuous island 640) in the structural layer 610, to press the discontinuous island 670 in the first conductive layer 618 against the FPC bond pad 380 for a period. The ACF may be disposed only on the FPC bond pads 380, as shown in FIG. 9A, or alternatively over the FPC bond pads 380 and over a larger region of the FPC 260 around the FPC bond pads 380. For example, in certain embodiments, the ACF may be disposed over the entire surface of the FPC 260 that includes the FPC bond pads 380.

As shown in FIG. 9B, the ACF 110 may comprise an adhesive material 114 that includes a plurality of electrically conductive beads 112 of substantially similar diameter. In certain embodiments the ACF 110 may employ beads of non-spherical shape, such as cylindrical beads or needle shaped beads. In certain embodiments the adhesive material 114 may be deposited on to the FPC bond pad 380 prior to aligning the flexure bond pad therewith. Alternatively, the adhesive material 114 may be deposited on a first side of the discontinuous island 670 of the first conductive layer 618 (e.g. facing the FPC bond pad 380) prior to bringing the thermode tool 120 into contact with an opposing second side of the discontinuous island 640 in the structural layer 610 (facing the thermode tool 120).

As shown in FIGS. 9A-B, the force 130 that presses (via the thermode tool 120) the flexure bond pads against FPC bond pads 380 during the period of bonding, may arrange the plurality of electrically conductive beads 112 in a monolayer. Each of the plurality of electrically conductive beads 112 in the monolayer may be in electrical contact with both the discontinuous island 670 in the first conductive layer 618 and the corresponding FPC bond pad 380. The thermode tool 120 may also transfer heat through the discontinuous island 640 in the structural layer 610 during the period of bonding, and raise the temperature of the adhesive material 114 during such period, for example to accelerate curing of the adhesive material 114.

In certain embodiments, the force 130 of the thermode tool 120 is sufficient to cause the electrically conductive beads 112 to be substantially elastically deformed in compression between the discontinuous island 670 in the first conductive layer 618 and the corresponding FPC bond pad 380 during the period of thermal curing of the adhesive material 114. After the thermode tool 120 is removed, the electrically conductive beads 112 cool (with the cured adhesive) from an elevated curing temperature. Such cooling causes the electrically conductive beads 112 to shrink relative to their expanded size during thermal curing of the adhesive material 114.

However, the force 130 is preferably chosen to be great enough that the post-curing shrinkage of the electrically conductive beads 112 cannot completely relieve the compressive deformation of the electrically conductive beads 112 that was experienced during curing. Hence, after curing of the adhesive material 114, and after removal of the thermode tool 120, the electrically conductive beads 112 may remain in compression (and somewhat compressively deformed) between the discontinuous island 670 in the first conductive layer 618 and the corresponding FPC bond pad 380.

Although residual compression of the electrically conductive beads 112 may correspond to some residual tension in the cured adhesive material 114, the such residual compression of the electrically conductive beads 112 may be desirable to enhance and ensure reliable electrical conductivity of the ACF 110. For example, in the case where the electrically conductive beads 112 are spherical, the residual compression may cause small flat spots where the electrically conductive beads 112 contact the discontinuous island 670 in the first conductive layer 618 and the corresponding FPC bond pad 380. Such flat spots can provide finite contact areas rather than point contacts, which may desirably reduce the electrical resistance of the ACF 110.

To help facilitate higher volume manufacturing, the thermode tool 130 may include a flat surface that is substantially larger than any of the plurality of discontinuous islands 640 in the structural layer 610, for example so that many discontinuous islands 670 in the first conductive layer 618 may be subjected to the applied pressure and heat transfer simultaneously.

The localized flexure tail thickness is greater at the location of the flexure bond pads, which may advantageously allow a large flat thermode tool (e.g. thermode tool 120) to provide pressure and heat only to the flexure bond pad locations—without a need to first pattern or precisely align the thermode tool 120. This may advantageously simplify high volume manufacture. That is, in certain embodiments of the present invention, the local thickness variations of the flexure tail 600 due to the discontinuous islands, may act as a self-aligning pattern to augment and assist the thermode tool to selectively apply pressure and heat more to desired flexure bond pad locations of the flexure tail terminal region 600 than to surrounding locations.

Figure 10:
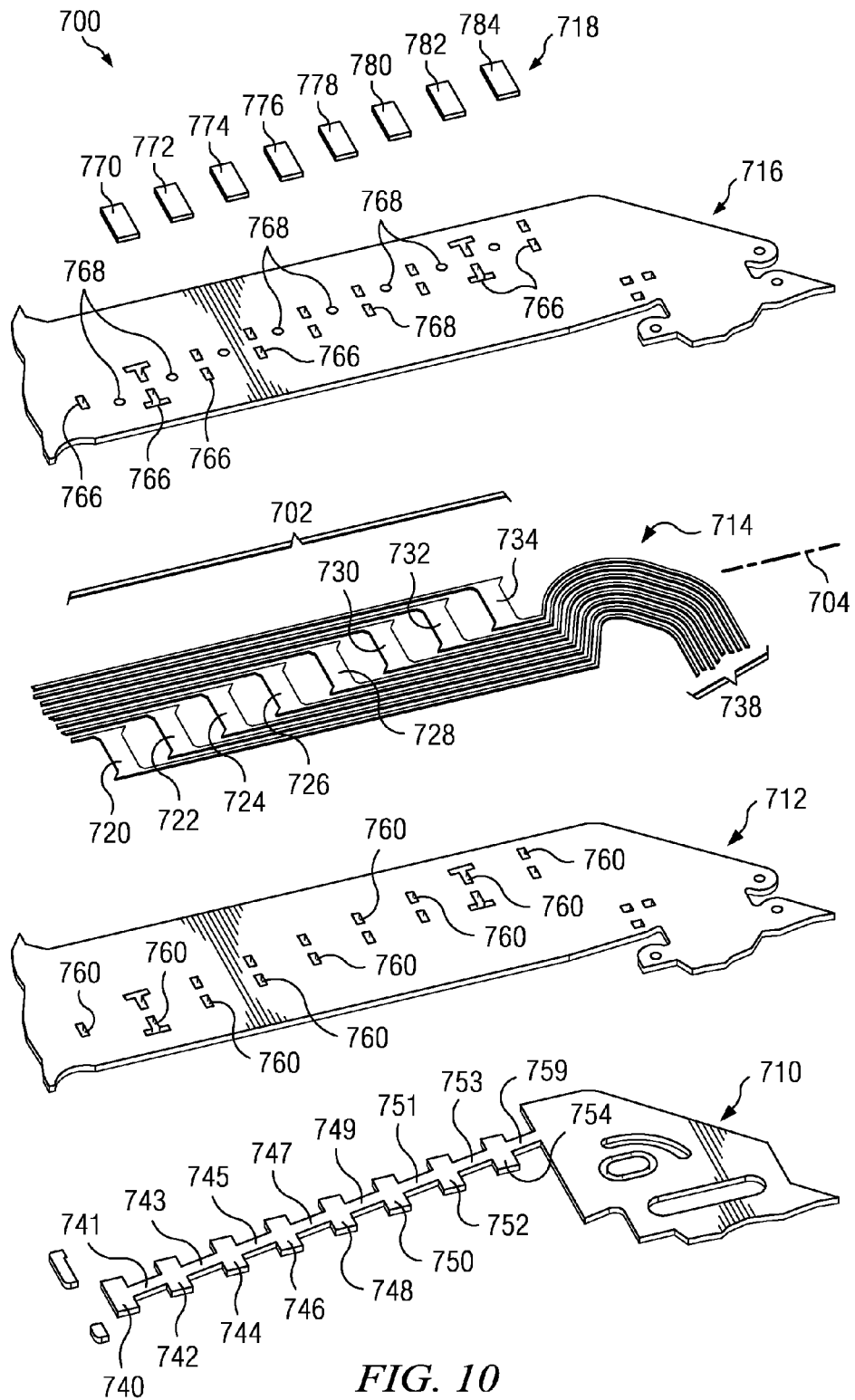
FIG. 10 is an exploded perspective view of a flexure tail terminal region, according to another embodiment of the present invention.

FIG. 10 is an exploded perspective view of a terminal region of a flexure tail 700, according to another embodiment of the present invention. The flexure tail 700 comprises a structural layer 710, a first conductive layer 718, and a second conductive layer 714. The flexure tail 700 also includes a first dielectric layer 716 between the first conductive layer 718 and the second conductive layer 714, and a second dielectric layer 712 between the structural layer 710 and the second conductive layer 714. In certain embodiments, the structural layer 710 comprises stainless steel, the dielectric layers 712, 716 comprise polyimide, and the conductive layers 714, 718 comprise copper, for example, though it is contemplated that other materials providing similar function might be used instead.

In the embodiment of FIG. 10, the second conductive layer 714 of the flexure tail 700 includes eight electrical traces 738. Each of the electrical traces 738 includes a corresponding one of a plurality of widened regions 720, 722, 724, 726, 728, 730, 732, 734, in a non-disposable region 702 to be aligned with FPC bond pads (e.g. FPC bond pads 380 shown in FIG. 3). Specifically, each of the plurality of widened regions 720, 722, 724, 726, 728, 730, 732, 734 may be preferably aligned with a corresponding one of the plurality of FPC bond pads 380.

As shown in FIG. 10, each of the widened regions 720, 722, 724, 726, 728, 730, 732, 734 may extend further transverse to the flexure tail longitudinal axis 704 than it extends parallel to the flexure tail longitudinal axis 704. In certain embodiments, such inequality may render the widened regions to be relatively less sensitive to transverse misalignment with the corresponding FPC bond pad 380. Such transverse misalignment during disk drive assembly may be caused by FPC position variability (e.g. due to alignment pin to hole clearance), and/or undesired movement of the flexure tail by a manufacturing employee. Note that, during disk drive assembly, a manufacturing employee may more easily misalign the terminal region of the flexure tail 700 transverse to the flexure tail longitudinal axis 704 than parallel to the flexure tail longitudinal axis 704, since the flexure is difficult to stretch, and so moves more easily in the transverse direction.

The embodiment of FIG. 10 also includes a plurality of segments 740, 742, 744, 746, 748, 750, 752, 754 in the structural layer 710. As can be seen in FIG. 7, each of the segments 740, 742, 744, 746, 748, 750, 752, 754 in the structural layer 710 is connected to another by one or more of a plurality of narrow bridges 741, 743, 745, 747, 749, 751, 753 in the structural layer 710. Preferably but not necessarily, each of the plurality of narrow bridges 741, 743, 745, 747, 749, 751, 753 in the structural layer 710 is oriented substantially parallel to the flexure tail longitudinal axis 704 (e.g. within ±10° of being perfectly parallel).

In the embodiment of FIG. 10, successive connections by the plurality of narrow bridges of the plurality of segments form a fishbone shape in the structural layer 710. The entire fishbone shape may not be connected to the rest of the structural layer 710; that is, the connection 759 may be absent in certain embodiments. Since the structural layer 710 does not include a peripheral frame around the plurality of segments 740, 742, 744, 746, 748, 750, 752, 754, the design of FIG. 10 is less sensitive to transverse misalignment of the thermode tool with respect to the plurality of segments 740, 742, 744, 746, 748, 750, 752, 754 during bonding.

Also in the embodiment of FIG. 10, a plurality of discontinuous islands 770, 772, 774, 776, 778, 780, 782, 784 are defined in the first conductive layer 718, and are disposed in general alignment with corresponding widened regions in the second conductive layer 714. For example, discontinuous island 774 is disposed in general alignment with widened region 724. In this context, an island in the first conductive layer 718 is considered to be discontinuous if it does not directly contact the rest of the first conductive layer 718, even if it is joined by a web or bridge in the first dielectric layer 716.

In the embodiment of FIG. 10, the segments 740, 742, 744, 746, 748, 750, 752, 754 in the structural layer 710 are disposed in general alignment with corresponding widened regions 720, 722, 724, 726, 728, 730, 732, 734 in the second conductive layer 714. For example, segment 740 is disposed in general alignment with widened region 720. In the embodiment of FIG. 10, each widened region 720, 722, 724, 726, 728, 730, 732, 734, along with the corresponding structural layer segment 740, 742, 744, 746, 748, 750, 752, 754 with which it is aligned, and the corresponding discontinuous island 770, 772, 774, 776, 778, 780, 782, 784 in the first conductive layer 718 with which it is also aligned, defines a flexure bond pad or flexure bond pad location.

In the embodiment of FIG. 10, each of the plurality of discontinuous islands 770, 772, 774, 776, 778, 780, 782, 784 in the first conductive layer 718 is electrically connected to a corresponding one of the plurality of widened regions 720, 722, 724, 726, 728, 730, 732, 734 in the second conductive layer 714 through one of a first plurality of conductive vias 768 through the first dielectric layer 716. The conductive vias 768 allow electrical connection between FPC bond pads (e.g. FPC bond pads 380) and the discontinuous islands 770, 772, 774, 776, 778, 780, 782, 784 in the first conductive layer 718, to function also as electrical connection to the corresponding widened regions 720, 722, 724, 726, 728, 730, 732, 734 in the second conductive layer 714. The conductive vias 768 through the first dielectric layer 716 do not electrically short the plurality of widened regions 720, 722, 724, 726, 728, 730, 732, 734 in the second conductive layer 714, because the islands 770, 772, 774, 776, 778, 780, 782, 784 in the first conductive layer 718 are discontinuous.

In the embodiment of FIG. 10, the segments in the structural layer 710 preferably increase the thickness of the flexure tail terminal region 700 at the locations of the flexure bond pads (e.g. at the location of the widened region 724). For example, the thickness of the structural layer may be preferably less than 25 microns, the thickness of each of the dielectric layers may be preferably less than 15 microns, the thickness of each of the conductive layers may be preferably less than 15 microns, while a total thickness of the flexure tail terminal region 700 at the flexure bond pads is preferably at least 35 microns. Such inequalities may enhance the utility of a non-patterned thermode tool to apply more uniform heat and pressure to the flexure bond pads during bonding.

In the embodiment of FIG. 10, the discontinuous islands 770, 772, 774, 776, 778, 780, 782, 784 in the first conductive layer 718 are the most protruding features on the surface of the flexure tail 700 that faces the FPC (e.g. FPC 260). For example, no cover layer is even with, or protrudes more than, the conductive discontinuous islands 770, 772, 774, 776, 778, 780, 782, 784. Such feature may facilitate simultaneous bonding of multiple bond pads by single tool, for example a thermode tool that accomplishes bonding by applying heat and pressure to an anisotropic conductive film.

In the embodiment of FIG. 10, each of the widened regions 720, 722, 724, 726, 728, 730, 732, 734 defines a widened region width that is measured parallel to the flexure tail longitudinal axis 704 Likewise, each of the plurality of structural layer segments 740, 742, 744, 746, 748, 750, 752, 754 defines a segment width that is measured parallel to the flexure tail longitudinal axis 704. In certain embodiments, the widened region width is preferably no greater than but at least 80% of the segment width. Such inequality may enhance the uniformity of the heat and pressure transferred from the thermode tool through the discontinuous islands to the widened regions during bonding.

In the embodiment of FIG. 10, the first dielectric layer 716 covers the conductive traces 738 of the second conductive layer 714, except for a plurality of through openings 766, and the plurality of conductive vias 768, through the first dielectric layer 716. Each of the plurality of the openings 766 through the first dielectric layer 716 may be disposed adjacent at least one of the plurality of discontinuous islands 770, 772, 774, 776, 778, 780, 782, 784 in the first conductive layer 718. In certain embodiments, the openings 766 through the first dielectric layer 716 may serve an adhesive control purpose (e.g. to limit the spread of adhesive used during the flexure tail bonding process).

In the embodiment of FIG. 10, the second dielectric layer 712 electrically insulates the conductive traces 738 of the second conductive layer 714 from the structural layer 710. Such electrical insulation may be desired because the structural layer 710 may be electrically conductive (e.g. stainless steel), and so otherwise the structural layer 710 may cause an electrical short between the traces 738 and/or from the traces 738 to ground. In the embodiment of FIG. 10, the second dielectric layer 712 optionally includes a plurality of through openings 760. Each of the plurality of openings 760 through the second dielectric layer 712 may be disposed adjacent, but preferably not overlying, at least one of the plurality of structural layer segments 740, 742, 744, 746, 748, 750, 752, 754 in the structural layer 710. In certain embodiments, the openings 760 through the second dielectric layer 712 may be aligned with corresponding openings 766 in the first dielectric layer 716, and serve an adhesive control purpose (e.g. to limit the spread of adhesive used during the flexure tail bonding process).

In the embodiment of FIG. 10, the flexure tail terminal region 700 may optionally include a disposable test pad region to the left of the other structures shown in FIG. 10.

Such disposable test pad region has been cut away/is not shown in FIG. 10, to more clearly depict the bond pads and associated layers of the flexure tail terminal region 700. After HGA testing, and before the bond pads of the flexure tail 700 are bonded to the FPC, the disposable test pad region (that would lie to the left of the flexure tail terminal region that is shown in FIG. 10) is preferably cut away from the flexure tail 700, so that only the non-disposable region (e.g. including non-disposable region 702 of the second conductive layer 714), and the rest of the flexure tail 700 that would extend to the right of the non-disposable region, remains.

Figure 11:
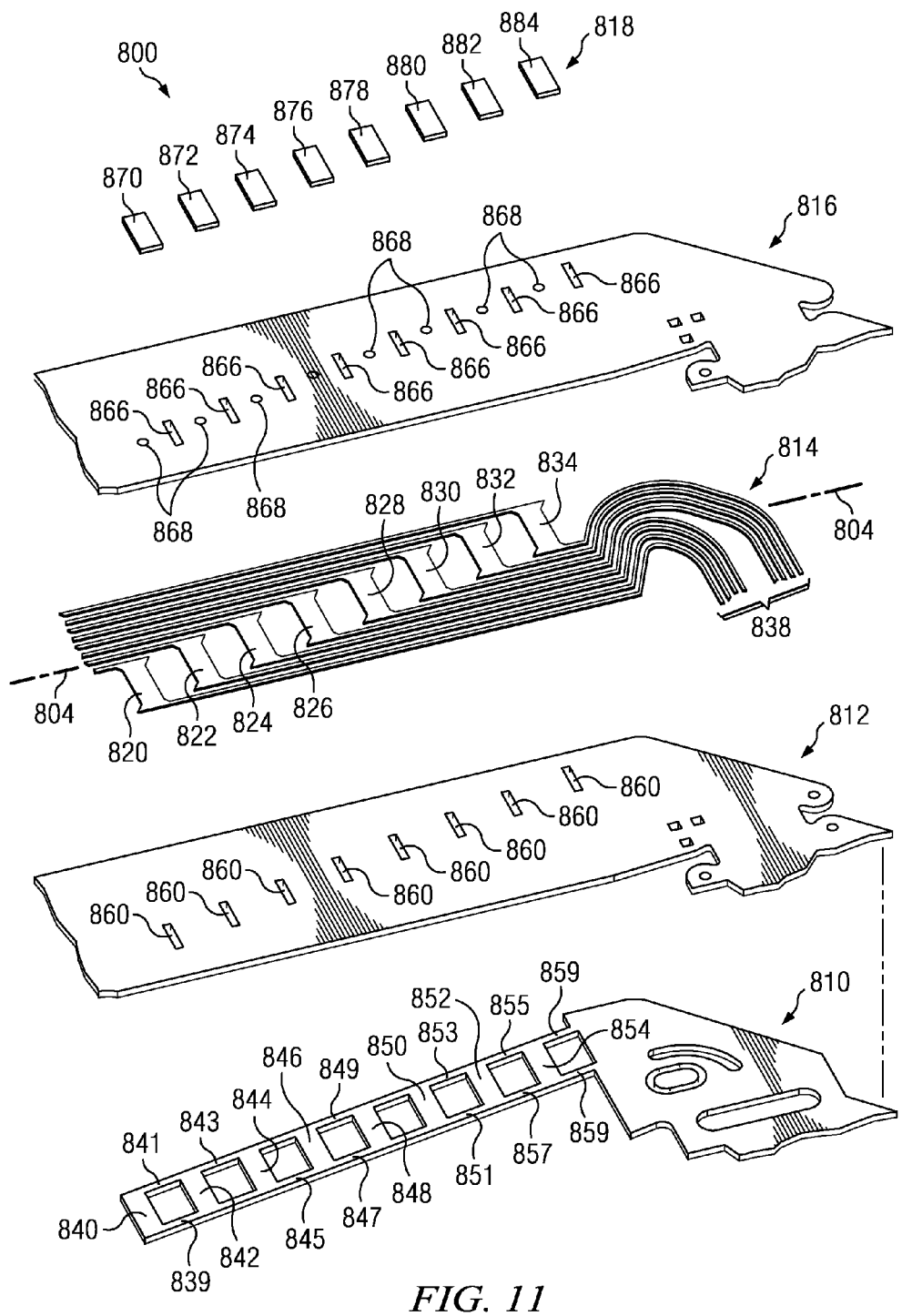
FIG. 11 is an exploded perspective view of a flexure tail terminal region, according to another embodiment of the present invention.

FIG. 11 is an exploded perspective view of a terminal region of a flexure tail 800, according to another embodiment of the present invention. The flexure tail 800 comprises a structural layer 810, a first conductive layer 818, and a second conductive layer 814. The flexure tail 800 also includes a first dielectric layer 816 between the first conductive layer 818 and the second conductive layer 814, and a second dielectric layer 812 between the structural layer 810 and the second conductive layer 814. In certain embodiments, the structural layer 810 comprises stainless steel, the dielectric layers 812 comprise polyimide, and the conductive layers 814 comprise copper, for example, though it is contemplated that other materials providing similar function might be used instead.

In the embodiment of FIG. 11, the second conductive layer 814 of the flexure tail 800 includes eight electrical traces 838. Each of the electrical traces 838 includes a corresponding one of a plurality of widened regions 820, 822, 824, 826, 828, 830, 832, 834 to be bonded to the FPC (e.g. FPC 260 shown in FIG. 3). Each of the plurality of widened regions 820, 822, 824, 826, 828, 830, 832, 834 may be preferably aligned with a corresponding one of the plurality of FPC bond pads 380.

As shown in FIG. 11, each of the widened regions 820, 822, 824, 826, 828, 830, 832, 834 may extend further transverse to the flexure tail longitudinal axis 804 than it extends parallel to the flexure tail longitudinal axis 804. In certain embodiments, such inequality may render the widened regions to be relatively less sensitive to transverse misalignment with the corresponding FPC bond pad 380. Such transverse misalignment during disk drive assembly may be caused by FPC position variability (e.g. due to alignment pin to hole clearance), and/or undesired movement of the flexure tail by a manufacturing employee. Note that, during disk drive assembly, a manufacturing employee may more easily misalign the terminal region of the flexure tail 800 transverse to the flexure tail longitudinal axis 804 than parallel to the flexure tail longitudinal axis 804, since the flexure is difficult to stretch, and so moves more easily in the transverse direction.

The embodiment of FIG. 11 also includes a plurality of segments 840, 842, 844, 846, 848, 850, 852, 854 in the structural layer 810. As can be seen in FIG. 11, each of the segments 840, 842, 844, 846, 848, 850, 852, 854 in the structural layer 810 is connected to another by two of a plurality of narrow bridges (e.g. narrow bridges 839, 841, 843, 845, 847, 849, 851, 853, 855, 857 in the structural layer 810. Preferably but not necessarily, each of the plurality of narrow bridges 839, 841, 843, 845, 847, 849, 851, 853, 855, 857 in the structural layer 810 is oriented substantially parallel to the flexure tail longitudinal axis 804 (e.g. within ±10° of being perfectly parallel).

In the embodiment of FIG. 11, successive connections by the plurality of narrow bridges of the plurality of segments form a ladder shape in the structural layer 810. The entire ladder shape may not be connected to the rest of the structural layer 810; that is, the connections 859 may be absent in certain embodiments. Other of the narrow bridges of the ladder shape may also be optionally omitted from the design, in alternative embodiments. Since the structural layer 810 does not include a peripheral frame around the plurality of segments 840, 842, 844, 846, 848, 850, 852, 854, the design of FIG. 11 is less sensitive to transverse misalignment of the thermode tool with respect to the plurality of segments 840, 842, 844, 846, 848, 850, 852, 854 during bonding.

Also in the embodiment of FIG. 11, a plurality of discontinuous islands 870, 872, 874, 876, 878, 880, 882, 884 are defined in the first conductive layer 818, and are disposed in general alignment with corresponding widened regions in the second conductive layer 814. For example, discontinuous island 874 is disposed in general alignment with widened region 824. In this context, an island in the first conductive layer 818 is considered to be discontinuous if it does not directly contact the rest of the first conductive layer 818, even if it is joined by a web or bridge in the first dielectric layer 816.

In the embodiment of FIG. 11, the segments 840, 842, 844, 846, 848, 850, 852, 854 in the structural layer 810 are disposed in general alignment with corresponding widened regions 820, 822, 824, 826, 828, 830, 832, 834 in the second conductive layer 814. For example, segment 840 is disposed in general alignment with widened region 820. In the embodiment of FIG. 11, each widened region 820, 822, 824, 826, 828, 830, 832, 834, along with the corresponding structural layer segment 840, 842, 844, 846, 848, 850, 852, 854 with which it is aligned, and the corresponding discontinuous island 870, 872, 874, 876, 878, 880, 882, 884 in the first conductive layer 818 with which it is also aligned, defines a flexure bond pad or flexure bond pad location.

In the embodiment of FIG. 11, each of the plurality of discontinuous islands 870, 872, 874, 876, 878, 880, 882, 884 in the first conductive layer 818 is electrically connected to a corresponding one of the plurality of widened regions 820, 822, 824, 826, 828, 830, 832, 834 in the second conductive layer 814 through one of a first plurality of conductive vias 868 through the first dielectric layer 816. The conductive vias 868 allow electrical connection between FPC bond pads (e.g. FPC bond pads 380) and the discontinuous islands 870, 872, 874, 876, 878, 880, 882, 884 in the first conductive layer 818, to function also as electrical connection to the corresponding widened regions 820, 822, 824, 826, 828, 830, 832, 834 in the second conductive layer 814. The conductive vias 868 through the first dielectric layer 816 do not electrically short the plurality of widened regions 820, 822, 824, 826, 828, 830, 832, 834 in the second conductive layer 814, because the islands 870, 872, 874, 876, 878, 880, 882, 884 in the first conductive layer 818 are discontinuous.

In the embodiment of FIG. 11, the segments in the structural layer 810 preferably increase the thickness of the flexure tail terminal region 800 at the locations of the flexure bond pads (e.g. at the location of the widened region 822). For example, the thickness of the structural layer may be preferably less than 25 microns, the thickness of each of the dielectric layers may be preferably less than 15 microns, the thickness of each of the conductive layers may be preferably less than 15 microns, while a total thickness of the flexure tail terminal region 800 at the flexure bond pads is preferably at least 35 microns. Such inequalities may enhance the utility of a non-patterned thermode tool to apply more uniform heat and pressure to the flexure bond pads during bonding.

In the embodiment of FIG. 11, the discontinuous islands 870, 872, 874, 876, 878, 880, 882, 884 in the first conductive layer 818 are the most protruding features on the surface of the flexure tail 800 that faces the FPC (e.g. FPC 260). For example, no cover layer is even with, or protrudes more than, the conductive discontinuous islands 870, 872, 874, 876, 878, 880, 882, 884. Such feature may facilitate simultaneous bonding of multiple bond pads by single tool, for example a thermode tool that accomplishes bonding by applying heat and pressure to an anisotropic conductive film.

In the embodiment of FIG. 11, each of the widened regions 820, 822, 824, 826, 828, 830, 832, 834 defines a widened region width that is measured parallel to the flexure tail longitudinal axis 804 Likewise, each of the plurality of structural layer segments 840, 842, 844, 846, 848, 850, 852, 854 defines a segment width that is measured parallel to the flexure tail longitudinal axis 804. In certain embodiments, the widened region width is preferably no greater than but at least 80% of the segment width. Such inequality may enhance the uniformity of the heat and pressure transferred from the thermode tool through the discontinuous islands to the widened regions during bonding.

In the embodiment of FIG. 11, the first dielectric layer 816 covers the conductive traces 838 of the second conductive layer 814, except for a plurality of through openings 866, and the plurality of conductive vias 868, through the first dielectric layer 816. Each of the plurality of the openings 866 through the first dielectric layer 816 may be disposed adjacent at least one of the plurality of discontinuous islands 870, 872, 874, 876, 878, 880, 882, 884 in the first conductive layer 818. In certain embodiments, the openings 866 through the first dielectric layer 816 may serve an adhesive control purpose (e.g. to limit the spread of adhesive used during the flexure tail bonding process).

In the embodiment of FIG. 11, the second dielectric layer 812 electrically insulates the conductive traces 838 of the second conductive layer 814 from the structural layer 810. Such electrical insulation may be desired because the structural layer 810 may be electrically conductive (e.g. stainless steel), and so otherwise the structural layer 810 may cause an electrical short between the traces 838 and/or from the traces 838 to ground. In the embodiment of FIG. 11, the second dielectric layer 812 optionally includes a plurality of through openings 860. Each of the plurality of the openings 860 through the second dielectric layer 812 may be disposed adjacent, but preferably not overlying, at least one of the plurality of structural layer segments 840, 842, 844, 846, 848, 850, 852, 854 in the structural layer 810. In certain embodiments, the openings 860, 862, 864, 866, 868, 870, 872, 874 through the second dielectric layer 812 may be aligned with corresponding openings 866 in the first dielectric layer 816, and serve an adhesive control purpose (e.g. to limit the spread of adhesive used during the flexure tail bonding process).

In the embodiment of FIG. 11, the flexure tail terminal region 800 may optionally include a disposable test pad region to the left of the other structures shown in FIG. 11. Such disposable test pad region has been cut away/is not shown in FIG. 11, to more clearly depict the bond pads and associated layers of the flexure tail terminal region 800. After HGA testing, and before the bond pads of the flexure tail 800 are bonded to the FPC, the disposable test pad region (that would lie to the left of the flexure tail terminal region that is shown in FIG. 11) is preferably cut away from the flexure tail 800.

Figure 12:
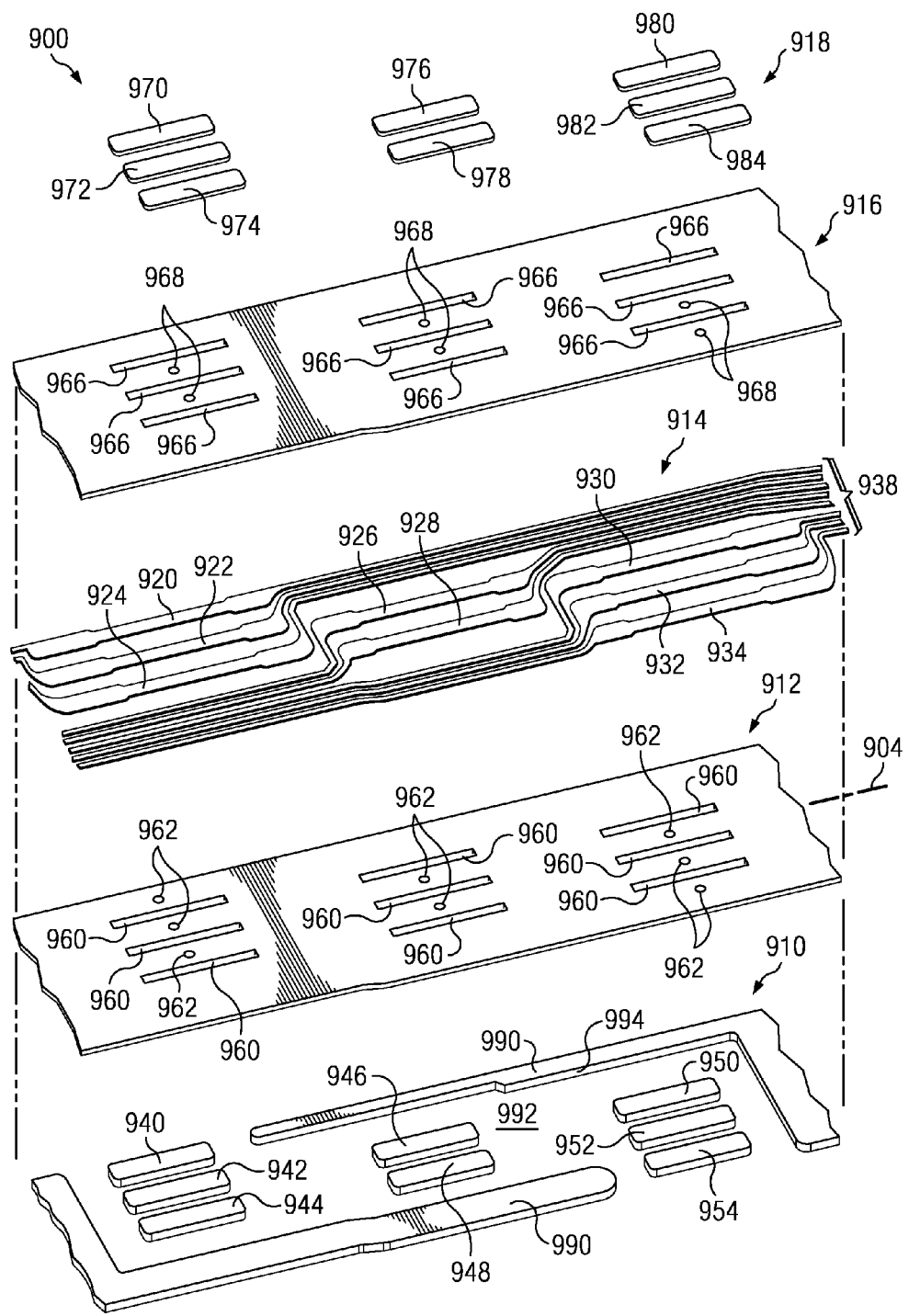
FIG. 12 is an exploded perspective view of a flexure tail terminal region, according to another embodiment of the present invention.

FIG. 12 is an exploded perspective view of a terminal region of a flexure tail 900, according to an embodiment of the present invention. The flexure tail 900 of the laminate flexure comprises a structural layer 910, a first conductive layer 918, and a second conductive layer 914. The flexure tail 900 also includes a first dielectric layer 916 between the first conductive layer 918 and the second conductive layer 914, and a second dielectric layer 912 between the structural layer 910 and the second conductive layer 914. In certain embodiments, the structural layer 910 comprises stainless steel, the dielectric layers 912, 916 comprise polyimide, and the conductive layers 914, 918 comprise copper, for example, though it is contemplated that other materials providing similar function might be used instead.

In the embodiment of FIG. 12, the second conductive layer 914 of the flexure tail 900 includes eight electrical traces 938, although a different number of electrical traces might be employed in any of the embodiments described herein. Each of the electrical traces 938 includes a corresponding one of a plurality of widened regions 920, 922, 924, 926, 928, 930, 932, 934, which is preferably aligned with a corresponding one of a plurality of FPC bond pads. In this context, "widened" means wider than the width of a trace 938 in an intermediate region where the flexure tail runs along the arm (i.e. the width of a trace 938 at the right side of FIG. 12).

As shown in FIG. 12, each of the widened regions 920, 922, 924, 926, 928, 930, 932, 934 may extend further parallel to the flexure tail longitudinal axis 904 than it extends transverse to the flexure tail longitudinal axis 904. In certain embodiments, such inequality may render the widened regions to be relatively less sensitive to axial misalignment with the corresponding FPC bond pad. Such axial misalignment during disk drive assembly may be caused by FPC position variability (e.g. due to alignment pin to hole clearance), and/or rotational positioning variability of the head gimbal assembly about its swage axis (e.g. that may result from the swaging process), and/or variability in flexure tail routing through positioning features along the actuator arm (e.g. due to clearance between the flexure tail and a positioning groove that may run along an edge of the actuator arm), and/or variation in the position of the actuator arm tip along the swaging axis.

Also in the embodiment of FIG. 12, a plurality of discontinuous islands 970, 972, 974, 976, 978, 980, 982, 984 are defined in the first conductive layer 918, and are disposed in general alignment with corresponding widened regions in the second conductive layer 914. For example, discontinuous island 974 is disposed in general alignment with widened region 924. In this context, an island in the first conductive layer 918 is considered to be discontinuous if it does not directly contact the rest of the first conductive layer 918, even if it is joined by a web or bridge in the first dielectric layer 916.

Also in the embodiment of FIG. 12, a plurality of discontinuous islands 940, 942, 944, 946, 948, 950, 952, 954 are defined in the structural layer 910 and are disposed in general alignment with corresponding widened regions in the second conductive layer 938. For example, discontinuous island 940 is disposed in general alignment with widened region 920. In this context, an island in the structural layer 910 is considered to be discontinuous if it does not directly contact the rest of the structural layer 910, even if it is joined by a web or bridge in the second dielectric layer 912. In the embodiment of FIG. 12, each widened region 920, 922, 924, 926, 928, 930, 932, 934, along with the corresponding discontinuous island 940, 942, 944, 946, 948, 950, 952, 954 in the structural layer 910 with which it is aligned, and the corresponding discontinuous island 970, 972, 974, 976, 978, 980, 982, 984 in the first conductive layer 918 with which it is also aligned, defines a flexure bond pad or flexure bond pad location.

In the embodiment of FIG. 12, each of the plurality of discontinuous islands 970, 972, 974, 976, 978, 980, 982, 984 in the first conductive layer 918 is electrically connected to a corresponding one of the plurality of widened regions 920, 922, 924, 926, 928, 930, 932, 934 in the second conductive layer 914 through one of a first plurality of conductive vias 968 through the first dielectric layer 916. The conductive vias 968 allow electrical connection between FPC bond pads and the discontinuous islands 970, 972, 974, 976, 978, 980, 982, 984 in the first conductive layer 918, to function also as electrical connection to the corresponding widened regions 920, 922, 924, 926, 928, 930, 932, 934 in the second conductive layer 914. The conductive vias 968 through the first dielectric layer 916 do not electrically short the plurality of widened regions 920, 922, 924, 926, 928, 930, 932, 934 in the second conductive layer 914, because the islands 970, 972, 974, 976, 978, 980, 982, 984 in the first conductive layer 918 are discontinuous.

Also in the embodiment of FIG. 12, each of the plurality of discontinuous islands 940, 942, 944, 946, 948, 950, 952, 954 in the structural layer 910 is optionally electrically connected to a corresponding one of the plurality of widened regions 920, 922, 924, 926, 928, 930, 932, 934 in the second conductive layer 914 through one of a second plurality of conductive vias 962 through the second dielectric layer 912. The optional conductive vias 962 allow the plurality of discontinuous islands 940, 942, 944, 946, 948, 950, 952, 954 in the structural layer 910 to function as convenient electrical contacts for probing or testing (or other temporary or permanent electrical connection to) the plurality of widened regions 920, 922, 924, 926, 928, 930, 932, 934 in the second conductive layer 914, accessible from the opposite side of the flexure tail terminal region 900 than are the discontinuous islands 970, 972, 974, 976, 978, 980, 982, 984 in the first conductive layer 918. The optional conductive vias 962 through the second dielectric layer 912 do not electrically short the plurality of widened regions 920, 922, 924, 926, 928, 930, 932, 934 in the second conductive layer 914, because the islands 940, 942, 944, 946, 948, 950, 952, 954 in the structural layer 910 are discontinuous.

In the embodiment of FIG. 12, the structural layer 910 includes a peripheral frame 990 that defines and surrounds a structural layer window 992. As shown in FIG. 12, the discontinuous islands 940, 942, 944, 946, 948, 950, 952, 954 are disposed within the structural layer window 992. The peripheral frame 990 underlies a region of the plurality of electrical traces 938 where the traces are relatively narrow. Although the structural layer window 992 has a broken and open inner contour 994 in the embodiment of FIG. 12, it may be a closed and continuous inner contour in certain alternative embodiments.

In the embodiment of FIG. 12, the discontinuous islands in the structural layer 910 preferably increase the thickness of the flexure tail terminal region 900 at the locations of the flexure bond pads (e.g. at the location of the widened region 922). For example, the thickness of the structural layer may be preferably less than 25 microns, the thickness of each of the dielectric layers may be preferably less than 15 microns, the thickness of each of the conductive layers may be preferably less than 15 microns, while a total thickness of the flexure tail terminal region 900 at the flexure bond pads is preferably at least 35 microns. Such inequalities may enhance the utility of a non-patterned thermode tool to apply more uniform heat and pressure to the flexure bond pads during bonding.

In the embodiment of FIG. 12, the discontinuous islands 970, 972, 974, 976, 978, 980, 982, 984 in the first conductive layer 918 are the most protruding features on the surface of the flexure tail 900 that faces the FPC. For example, no cover layer is even with, or protrudes more than, the conductive discontinuous islands 970, 972, 974, 976, 978, 980, 982, 984. Such feature may facilitate simultaneous bonding of multiple bond pads by single tool, for example a thermode tool that accomplishes bonding by applying heat and pressure to an anisotropic conductive film. Likewise, the plurality of discontinuous islands 940, 942, 944, 946, 948, 950, 952, 954 in the structural layer 910 are the highest features on the side of the flexure tail 900 that faces away from the FPC, which may also facilitate bonding of multiple bond pads by single tool.

In the embodiment of FIG. 12, each of the widened regions 920, 922, 924, 926, 928, 930, 932, 934 defines a widened region width that is measured transverse to the flexure tail longitudinal axis 904 Likewise, each of the plurality of discontinuous islands 940, 942, 944, 946, 948, 950, 952, 954 in the structural layer 910 defines an island width that is measured transverse to the flexure tail longitudinal axis 904. In certain embodiments, the widened region width is preferably no greater than but at least 80% of the island width. Such inequality may enhance the uniformity of the heat and pressure transferred from the thermode tool through the discontinuous islands to the widened regions during bonding.

In the embodiment of FIG. 12, the second dielectric layer 912 electrically insulates the conductive traces 938 of the second conductive layer 914 from the structural layer 910. Such electrical insulation may be desired because the structural layer 910 may be electrically conductive (e.g. stainless steel), and so otherwise the structural layer 910 may cause an electrical short between the traces 938 and/or from the traces 938 to ground. In the embodiment of FIG. 12, the second dielectric layer 912 optionally includes a plurality of through openings 960. Each of the plurality of the openings 960 through the second dielectric layer 912 may be disposed adjacent, but preferably not overlying, at least one of the plurality of discontinuous islands 940, 942, 944, 946, 948, 950, 952, 954 in the structural layer 910. In certain embodiments, the openings 960 through the second dielectric layer 912 may serve an adhesive control purpose (e.g. to limit the spread of adhesive used during the flexure tail bonding process).

In the embodiment of FIG. 12, the flexure tail terminal region 900 may optionally include a disposable test pad region to the left of the other structures shown in FIG. 12. Such disposable test pad region has been cut away/is not shown in FIG. 12, to more clearly depict the bond pads and associated layers of the flexure tail terminal region 900. After HGA testing, and before the bond pads of the flexure tail 900 are bonded to the FPC, the disposable test pad region (that would lie to the left of the flexure tail terminal region that is shown in FIG. 12) is preferably cut away from the flexure tail 900, so that only the non-disposable region shown in FIG. 12 (and the rest of the flexure tail 900 that would extend to the right of the view of FIG. 12) remains.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a disk rotably mounted to the disk drive base;
   an actuator pivotably mounted to the disk drive base, the actuator including a flexible printed circuit (FPC) that includes a plurality of electrically conductive FPC bond pads; and at least one head gimbal assembly attached to the actuator, the at least one head gimbal assembly comprising
a read head; and
a suspension assembly that comprises
a load beam, and
a laminate flexure that comprises a structural layer, first and second conductive layers, a first dielectric layer between the first and second conductive layers, and a second dielectric layer between the structural layer and the second conductive layer, the second conductive layer including a plurality of electrical traces, the laminate flexure including a tongue portion that connects to the read head and a flexure tail that extends to the plurality of FPC bond pads;
wherein the flexure tail includes a plurality of flexure bond pads, each of the plurality of flexure bond pads being aligned with a corresponding one of the plurality of FPC bond pads; and
wherein each of the plurality of flexure bond pads includes
a widened region of a corresponding one of the plurality of electrical traces in the second conductive layer,
a corresponding one of a plurality of discontinuous islands in the structural layer, and
a corresponding one of a plurality of discontinuous islands in the first conductive layer that is electrically connected to the widened region of the corresponding one of the plurality of electrical traces in the second conductive layer through one of a first plurality of conductive vias through the first dielectric layer.

2. The disk drive of claim 1 wherein the structural layer comprises stainless steel, the first and second dielectric layers comprise polyimide, and the first and second conductive layers comprise copper.

3. The disk drive of claim 2 wherein a thickness of the structural layer is less than 25 microns, a thickness of the first dielectric layer is no greater than 15 microns, a thickness of the second dielectric layer is no greater than 15 microns, a thickness of the first conductive layer is no greater than 15 microns, a thickness of the second conductive layer is no greater than 15 microns, and a total thickness at each of the plurality of flexure bond pads is at least 35 microns.

4. The disk drive of claim 1 further comprising a first plurality of openings through the first dielectric layer, and a second plurality of openings through the second dielectric layer, each of the second plurality of openings being disposed adjacent but not overlying at least one of the plurality of discontinuous islands in the structural layer, each of the first plurality of openings being aligned with a corresponding one of the second plurality of openings.

5. The disk drive of claim 1 wherein each of the flexure bond pads is bonded to the corresponding one of the plurality of FPC bond pads by an anisotropic conductive film.

6. The disk drive of claim 5 wherein the anisotropic conductive film comprises an adhesive material that includes a plurality of electrically conductive beads of substantially similar size.

7. The disk drive of claim 1 wherein the corresponding one of the plurality of discontinuous islands in the structural layer is electrically connected to the widened region of the corresponding one of the plurality of electrical traces in the second conductive layer through one of a second plurality of conductive vias through the second dielectric layer.

8. The disk drive of claim 1 wherein the structural layer includes a peripheral frame that defines and surrounds a structural layer window, the plurality of discontinuous islands in the structural layer being disposed within the structural layer window.

9. The disk drive of claim 8 wherein the peripheral frame underlies a narrow region of each of the plurality of electrical traces.

10. The disk drive of claim 8 wherein the structural layer window has a broken and open inner contour.

11. The disk drive of claim 1 wherein the flexure tail defines a flexure tail longitudinal axis, and wherein the widened region of each of the plurality of electrical traces extends further transverse to the flexure tail longitudinal axis than it extends parallel to the flexure tail longitudinal axis.

12. The disk drive of claim 11 wherein the widened region of each of the plurality of electrical traces defines a widened region width that is measured parallel to the flexure tail longitudinal axis, and wherein each of the plurality of discontinuous islands in the structural layer defines an island width that is measured parallel to the flexure tail longitudinal axis; and wherein the widened region width is no greater than but at least 80% of the island width.

13. The disk drive of claim 1 wherein the flexure tail defines a flexure tail longitudinal axis, and wherein the widened region of each of the plurality of electrical traces extends further parallel to the flexure tail longitudinal axis than it extends transverse to the flexure tail longitudinal axis.

14. The disk drive of claim 13 wherein the widened region of each of the plurality of electrical traces defines a widened region width that is measured transverse to the flexure tail longitudinal axis, and wherein each of the plurality of discontinuous islands in the structural layer defines an island width that is measured transverse to the flexure tail longitudinal axis; and wherein the widened region width is no greater than but at least 80% of the island width.

15. A head gimbal assembly (HGA) for a disk drive, the HGA comprising:
a read head; and
a suspension assembly that comprises
a load beam, and
a laminate flexure that comprises a structural layer, first and second conductive layers, a first dielectric layer between the first and second conductive layers, and a second dielectric layer between the structural layer and the second conductive layer, the second conductive layer including a plurality of electrical traces, the laminate flexure including a tongue portion that connects to the read head and a flexure tail that extends away from the tongue portion;
wherein the flexure tail includes a plurality of flexure bond pads, each of the plurality of flexure bond pads including
a widened region of a corresponding one of the plurality of electrical traces in the second conductive layer,
a corresponding one of a plurality of discontinuous islands in the structural layer, and
a corresponding one of a plurality of discontinuous islands in the first conductive layer that is electrically connected to the widened region of the corresponding one of the plurality of electrical traces in the second conductive layer through one of a first plurality of conductive vias through the first dielectric layer.

16. The HGA of claim 15 further comprising a first plurality of openings through the first dielectric layer, and a second plurality of openings through the second dielectric layer, each of the second plurality of openings being disposed adjacent but not overlying at least one of the plurality of discontinuous islands in the structural layer, each of the first plurality of openings being aligned with a corresponding one of the second plurality of openings.

17. The HGA of claim 15 wherein the structural layer includes a peripheral frame that defines and surrounds a structural layer window, the plurality of discontinuous islands in the structural layer being disposed within the structural layer window.

18. The HGA of claim 15 wherein the corresponding one of the plurality of discontinuous islands in the structural layer is electrically connected to the widened region of the corresponding one of the plurality of electrical traces in the second conductive layer through one of a second plurality of conductive vias through the second dielectric layer.

19. The HGA of claim 15 wherein the flexure tail defines a flexure tail longitudinal axis, and wherein the widened region of each of the plurality of electrical traces extends further transverse to the flexure tail longitudinal axis than it extends parallel to the flexure tail longitudinal axis.

20. The HGA of claim 19 wherein the widened region of each of the plurality of electrical traces defines a widened region width that is measured parallel to the flexure tail longitudinal axis, and wherein each of the plurality of discontinuous islands in the structural layer defines an island width that is measured parallel to the flexure tail longitudinal axis; and wherein the widened region width is no greater than but at least 80% of the island width.

21. The HGA of claim 15 wherein the flexure tail defines a flexure tail longitudinal axis, and wherein the widened region of each of the plurality of electrical traces extends further parallel to the flexure tail longitudinal axis than it extends transverse to the flexure tail longitudinal axis.

22. The HGA of claim 21 wherein the widened region of each of the plurality of electrical traces defines a widened region width that is measured transverse to the flexure tail longitudinal axis, and wherein each of the plurality of discontinuous islands in the structural layer defines an island width that is measured transverse to the flexure tail longitudinal axis; and wherein the widened region width is no greater than but at least 80% of the island width.

23. A head gimbal assembly (HGA) for a disk drive, the HGA comprising:
   a read head; and
   a suspension assembly that comprises
      a load beam, and
      a laminate flexure that comprises a structural layer, first and second conductive layers, a first dielectric layer between the first and second conductive layers, and a second dielectric layer between the structural layer and the second conductive layer, the second conductive layer including a plurality of electrical traces, the laminate flexure including a tongue portion that connects to the read head and a flexure tail that extends away from the tongue portion;
   wherein the flexure tail includes a plurality of flexure bond pads, each of the plurality of flexure bond pads including
      a widened region of a corresponding one of the plurality of electrical traces in the second conductive layer,
      a corresponding one of a plurality of segments in the structural layer, each of the plurality of segments being connected to another by one or more of a plurality of narrow bridges in the structural layer, and
      a corresponding one of a plurality of discontinuous islands in the first conductive layer that is electrically connected to the widened region of the corresponding one of the plurality of electrical traces in the second conductive layer through one of a plurality of conductive vias through the first dielectric layer.

24. The HGA of claim 23 wherein successive connections by the plurality of narrow bridges of the plurality of segments form a fishbone shape in the structural layer.

25. The HGA of claim 23 wherein successive connections by the plurality of narrow bridges of the plurality of segments form a ladder shape in the structural layer.

26. The HGA of claim 23 further comprising a first plurality of openings through the first dielectric layer, and a second plurality of openings through the second dielectric layer, each of the second plurality of openings being disposed adjacent but not overlying at least one of the plurality of segments in the structural layer, each of the first plurality of openings being aligned with a corresponding one of the second plurality of openings.

27. The HGA of claim 23 wherein the flexure tail defines a flexure tail longitudinal axis, and wherein the widened region of each of the plurality of electrical traces extends further transverse to the flexure tail longitudinal axis than it extends parallel to the flexure tail longitudinal axis.

28. The HGA of claim 27 wherein the widened region of each of the plurality of electrical traces defines a widened region width that is measured parallel to the flexure tail longitudinal axis, and wherein each of the plurality of segments in the structural layer defines a segment width that is measured parallel to the flexure tail longitudinal axis; and wherein the widened region width is no greater than but at least 80% of the segment width.

29. The HGA of claim 27 wherein each of the plurality of narrow bridges in the structural layer is oriented substantially parallel to the flexure tail longitudinal axis.

* * * * *